United States Patent
An et al.

(10) Patent No.: US 11,544,721 B2
(45) Date of Patent: Jan. 3, 2023

(54) SUPPORTING AUTOMATION OF CUSTOMER SERVICE

(71) Applicant: AT&T Intellectual Property I, L.P., Atlanta, GA (US)

(72) Inventors: Ni An, Plano, TX (US); Yunmiao Wang, Garland, TX (US); Martin Patrick McEnroe, Plano, TX (US); Joshua D. West, Leander, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 286 days.

(21) Appl. No.: 16/792,987

(22) Filed: Feb. 18, 2020

(65) Prior Publication Data

US 2021/0256534 A1    Aug. 19, 2021

(51) Int. Cl.
*G06Q 10/00*    (2012.01)
*G06Q 30/00*    (2012.01)
(Continued)

(52) U.S. Cl.
CPC ......... *G06Q 30/016* (2013.01); *G06F 16/285* (2019.01); *G06F 40/40* (2020.01);
(Continued)

(58) Field of Classification Search
CPC .... G06Q 30/016; G06Q 10/10; G06F 16/285; G06F 40/40; G06F 16/3329;
(Continued)

(56) References Cited

U.S. PATENT DOCUMENTS

| 10,726,061 B2* | 7/2020 | Chu ................... G10L 15/1815 |
| 2013/0007137 A1* | 1/2013 | Azzam ................... H04L 51/16 |
|  |  | 709/206 |

(Continued)

FOREIGN PATENT DOCUMENTS

| CN | 106796594 A | * | 5/2017 | ......... G06F 16/3329 |
| EP | 3499508 A1 | * | 6/2019 |  |

OTHER PUBLICATIONS

Ionain Mohib Derrar, ("Clustering for the Automatic Annotation of Customer Service Chat Messages,"Faculty of Computing and Electrical Engineering, Master of Science Thesis, Tampere University, Master's Degree Program in Information Technology, Jan. 2019, 75 pages) (Year: 2019).*

(Continued)

*Primary Examiner* — Gabrielle A McCormick

(57) ABSTRACT

The present disclosure describes various methods, computer-readable media, and apparatuses for supporting customer service automation. The support for automation of customer service may be based on analysis of conversations between customers and customer service agents of a customer service center. The support for automation of customer service may be based on analysis of conversations between customers and customer service agents to identify conversation-level topics and utterance-level topics from the customer service conversations. The support for automation of customer service may be based on use of conversation-level topics and utterance-level topics identified from the customer service conversations to control initiation of customer service automation actions for supporting automation of customer service of the customer service center. The support for automation of customer service may be based on use of conversation-level and utterance-level topics identified from the customer service conversations to control (Continued)

selection, and design, of chatbots for the customer service center.

20 Claims, 6 Drawing Sheets

(51) Int. Cl.
  *G06Q 10/10*   (2012.01)
  *G06F 16/28*   (2019.01)
  *G06F 40/40*   (2020.01)
  *G06N 3/04*    (2006.01)
  *H04L 51/02*   (2022.01)
  *G06N 3/08*    (2006.01)
  *H04L 51/216*  (2022.01)

(52) U.S. Cl.
  CPC ............... *G06N 3/04* (2013.01); *G06N 3/08* (2013.01); *G06Q 10/10* (2013.01); *H04L 51/02* (2013.01); *H04L 51/216* (2022.05)

(58) Field of Classification Search
  CPC ........ G06F 40/216; G06F 40/30; G06F 40/35; G06N 3/04; G06N 3/08; G06N 7/005; H04L 51/02; H04L 51/16; H04L 51/04; H04L 51/216
  See application file for complete search history.

(56) References Cited

U.S. PATENT DOCUMENTS

| | | | |
|---|---|---|---|
| 2019/0130904 A1* | 5/2019 | Homma | G10L 15/26 |
| 2019/0155947 A1* | 5/2019 | Chu | G06N 5/04 |
| 2019/0243917 A1* | 8/2019 | Ashoori | G06F 16/3344 |
| 2019/0325897 A1* | 10/2019 | Liu | H04M 3/5175 |
| 2020/0204682 A1* | 6/2020 | Gorny | H04M 3/5166 |
| 2020/0364300 A1* | 11/2020 | Tan | G06N 20/00 |
| 2021/0097140 A1* | 4/2021 | Chatterjee | G06N 3/049 |
| 2021/0142791 A1* | 5/2021 | Penta | G06F 40/30 |
| 2021/0149921 A1* | 5/2021 | Alexander | G06F 16/65 |

OTHER PUBLICATIONS

Daniil Sokolov, "AI models for topic discovery in Customer Service Insights," Microsoft Dynamics 365 Blog, Oct. 3, 2019, 7 pages.

Honain Mohib Derrar, "Clustering for the Automatic Annotation of Customer Service Chat Messages," Faculty of Computing and Electrical Engineering, Master of Science Thesis, Tampere University, Master's Degree Program in Information Technology, Jan. 2019, 75 pages.

Shotorbani, et al., "A Hybrid Method for Manufacturing Text Mining Based on Document Clustering and Topic Modeling Techniques," IFIP International Conference on Advances in Production Management Systems (APMS), Sep. 3, 2016, 11 pages.

Silva, et al., "Document Clustering and Cluster Topic Extraction in Multilingual Corpora," Proceedings 2001 IEEE International Conference on Data Mining, Nov. 29, 2001-Dec. 2, 2001, 8 pages.

* cited by examiner

SUPPORTING AUTOMATION OF CUSTOMER SERVICE

TECHNICAL FIELD

The present disclosure relates generally to customer service, and more particularly to methods, computer-readable media, and apparatuses for supporting automation of customer service.

BACKGROUND

Customer service may be provided to customers in various contexts, such as before, during, and after purchases of goods and services. Customer service provided to customers may be provided in a manual way (e.g., by humans) or in an automated way (e.g., using kiosks, applications, artificial intelligence, and the like).

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
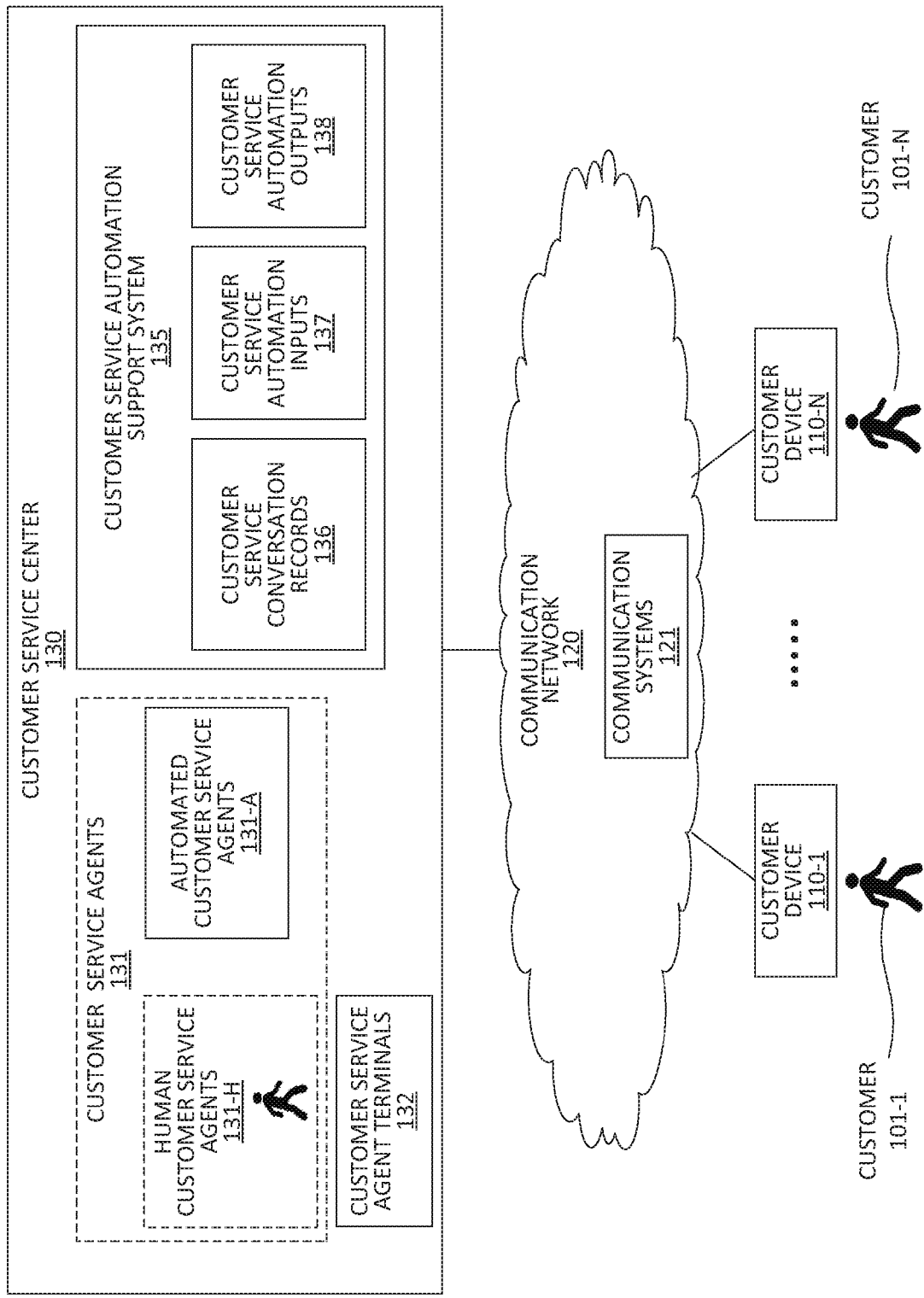
FIG. 1 illustrates an example system configured to support automation of customer service based on analysis of customer service conversations between customers and customer service agents.

The present disclosure describes various methods, computer-readable media, and apparatuses for supporting automation of customer service. The support for automation of customer service may be based on analysis of customer service conversations between customers and customer service agents of a customer service center. The support for automation of customer service may be based on analysis of customer service conversations between customers and customer service agents to identify a set of topics (e.g., conversation-level topics, utterance-level topics, and so forth) from the customer service conversations between the customers and the customer service agents. The support for automation of customer service may be based on performing analysis of customer service conversations between customers and customer service agents to identify a set of topics from the customer service conversations between the customers and the customer service agents and supporting automation of customer service based on the set of topics from the customer service conversations between customers and customer service agents. The support for automation of customer service may be based on performing analysis of customer service conversations between customers and customer service agents to determine a quantitative ranking of a set of topics from the customer service conversations between the customers and the customer service agents and supporting automation of customer service based on the quantitative ranking of the set of topics from the customer service conversations between customers and customer service agents. The support for automation of customer service may include obtaining a set of customer conversation records for a set of customer service conversations between customers and customer service agents, identifying, based on processing of the set of customer service conversation records, a set of topics of the customer service conversations (e.g., conversation-level topics, utterance-level topics, and so forth), determining a quantitative ranking of the topics in the set of topics of the customer service conversations, and initiating a management action based on the quantitative ranking of the topics in the set of topics of the customer service conversations. The support for automation of customer service may be provided based on analysis of the customer service conversations at the conversation level, thereby enabling identification and quantitative ranking of conversation-level topics and support for various management actions which may be provided based on the identification and quantitative ranking of the conversation-level topics (e.g., identification of topics for which chatbots are to be created, identification of problems, monitoring and tracking of trends, and so forth). The support for automation of customer service may be provided based on analysis of the customer service conversations at the utterance level (e.g., for a given conversation-level topic), thereby enabling identification and quantitative ranking of utterance-level topics and support for various management actions which may be provided based on the identification and quantitative ranking of the utterance-level topics (e.g., design of specific features to be provided by chatbots, monitoring and tracking of trends, and so forth). The support for automation of customer service based on analysis of the customer service conversations may be performed based on various capabilities, algorithms (e.g., clustering algorithms, topic extraction algorithms, and the like), models (e.g., general statistical models, Latent Dirichlet Allocation (LDA) models, and the like), evaluation criteria, and so forth. It will be appreciated that at least some such functions described in conjunction with support for automation of customer service also may be provided outside of the context of support for automation of customer service (e.g., supporting identification of repetitive topics from the customer service conversations between customers and customer service agents for use in other ways, supporting identification and quantitative ranking of repetitive topics from the customer service conversations between customers and customer service agents for use in other ways, and so forth).

In one example, a method is provided. The method includes obtaining, by a processing system including at least one processor, a set of customer service conversation records, wherein each of the customer service conversation records includes a respective set of utterances. The method includes dividing, by the processing system, the set of customer service conversation records into a set of clusters, wherein each of the clusters represents a respective group of the customer service conversation records having a respective conversation-level topic in common. The method includes determining, by the processing system from the set of clusters, a set of primary conversation-level topics. The method includes obtaining, by the processing system for at least one of the primary conversation-level topics associated with at least one of the clusters, a set of keywords, wherein the set of keywords is obtained based on the at least one of the primary conversation-level topics, wherein the set of keywords is obtained from a source different than the set of clusters. The method includes determining, by the processing system from the utterances of the at least one of the clusters of the at least one of the primary conversation-level topics, a set of utterance-level topics associated with the at least one of the primary conversation-level topics, wherein the set of utterance-level topics is determined based on the set of keywords. The method includes initiating, by the processing system based on the at least one of the primary conversation-level topics and the set of utterance-level topics, a customer service automation action.

In one example, a non-transitory computer-readable storage medium stores instructions which, when executed by a processing system, cause the processing system to perform operations. The operations include obtaining a set of customer service conversation records, wherein each of the customer service conversation records includes a respective set of utterances. The operations include dividing the set of customer service conversation records into a set of clusters, wherein each of the clusters represents a respective group of the customer service conversation records having a respective conversation-level topic in common. The operations include determining, from the set of clusters, a set of primary conversation-level topics. The operations include obtaining, for at least one of the primary conversation-level topics associated with at least one of the clusters, a set of keywords, wherein the set of keywords is obtained based on the at least one of the primary conversation-level topics, wherein the set of keywords is obtained from a source different than the set of clusters. The operations include determining, from the utterances of the at least one of the clusters of the at least one of the primary conversation-level topics, a set of utterance-level topics associated with the at least one of the primary conversation-level topics, wherein the set of utterance-level topics is determined based on the set of keywords. The operations include initiating, based on the at least one of the primary conversation-level topics and the set of utterance-level topics, a customer service automation action.

In one example, an apparatus includes a processing system including at least one processor and a computer-readable medium storing instructions which, when executed by the processing system, cause the processing system to perform operations. The operations include obtaining a set of customer service conversation records, wherein each of the customer service conversation records includes a respective set of utterances. The operations include dividing the set of customer service conversation records into a set of clusters, wherein each of the clusters represents a respective group of the customer service conversation records having a respective conversation-level topic in common. The operations include determining, from the set of clusters, a set of primary conversation-level topics. The operations include obtaining, for at least one of the primary conversation-level topics associated with at least one of the clusters, a set of keywords, wherein the set of keywords is obtained based on the at least one of the primary conversation-level topics, wherein the set of keywords is obtained from a source different than the set of clusters. The operations include determining, from the utterances of the at least one of the clusters of the at least one of the primary conversation-level topics, a set of utterance-level topics associated with the at least one of the primary conversation-level topics, wherein the set of utterance-level topics is determined based on the set of keywords. The operations include initiating, based on the at least one of the primary conversation-level topics and the set of utterance-level topics, a customer service automation action.

These and various other aspects of the present disclosure are discussed in greater detail below in connection with the examples of FIGS. 1-6.

FIG. 1 illustrates an example system configured to support automation of customer service based on analysis of customer service conversations between customers and customer service agents.

The system 100 may be configured to support customer service for a set of customers 101-1 to 101-N (collectively, customers 101). The customers 101 may be customers of one or more entities (e.g., companies, organizations, and the like) which may provide customer service for the customers 101 and, thus, may have relationships with the entities which may provide customer service for the customers 101. The customers 101 may receive customer service within various contexts, such as within the contexts of customer support (e.g., product support, service support, and the like), electronic commerce (e-commerce), entertainment, education, news, finance, healthcare, travel, and so forth. It will be appreciated that, although primarily presented herein with respect to supporting automation of customer service for customers 101 within specific customer service contexts (e.g., primarily within the context of technical support), automation of customer service for customers 101 may be provided within various other customer service contexts.

The system 100 includes a set of customer devices 110-1 to 110-N (collectively, customer devices 110) of the set of customers 101-1 to 101-N, respectively, a communication network 120, and a customer service center 130.

The customers 101 may use the customer devices 110 to interact with the customer service center 130. It will be appreciated, as discussed further below, that the customer devices 110 may or may not be related to the relationship between the customers 101 and the entity for which customer service is provided by the customer service center 130.

In one example, the customer devices 110 of the customers 101 may be related to the relationship between the customers 101 and the entity for which customer service is provided by the customer service center 130. For example, the customers 101 may be customers of an end user device company from which the customers 101 may buy or rent the customer devices 110, the customers 101 may be customers of a telecommunications service provider from which the customers 101 may obtain telecommunications services using the customer devices 110, and so forth.

In one example, the customer devices 110 of the customers 101 may be unrelated to the relationship between the customers 101 and the entity for which customer service is provided by the customer service center 130. For example, the customer devices 110 may be devices via which the customers 101 are able to interact with the company within the context of receiving customer service from the company, even though the customer service may be unrelated to the customer device 110. For example, a customer 101 may call customer service via a customer device 110 regarding a cable service subscribed to by the customer 101, initiate a chat session with customer service via a customer device 110 regarding a product purchased by the customer 101, and so forth.

The customer devices 110 of the customers 101 may include any devices via which the customers 101 may interact with the customer service center 130 for obtaining customer service from the customer service center 130. For example, the customer devices 110 may be desktop computers, laptop computers, tablet computers, smartphones, wearable devices, smart televisions, gaming systems, and so forth.

The communication network 120 may include one or more types of communication networks which may support communications between the customers 101 using the customer devices 110 and the customer service center 130. For example, the communication network 120 may include a traditional circuit switched network (e.g., a public switched telephone network (PSTN)). For example, the communication network 120 may include a packet network, such as an Internet Protocol (IP) network (e.g., a Voice over IP (VoIP) network, a Service over IP (SoIP) network, an IP Multimedia Subsystem (IMS) network, and the like), an asynchronous transfer mode (ATM) network, a wireless network (e.g., a cellular network such as a 2G network, a 3G network, a 4G network, a long term evolution (LTE) network, a 5G network, and the like), and so forth. It will be appreciated that the communication network 120 may include one or more access networks, one or more core networks, and so forth.

The communication network 120 includes communication systems 121 configured to support communications between the customers 101 using customer devices 110 and the customer service center 130. For example, communication systems 121 may include network elements (e.g., access devices (e.g., base transceiver stations (BTSs), WiFi access points (APs), and so forth), routers, switches, hubs, and so forth), network control devices, virtualization infrastructure configured to support network function virtualization (NFV) based on virtualized network functions (VNFs), servers configured to support various applications (e.g., policy servers, mobility servers, web servers, content servers, and the like), management systems, and so forth.

The customer service center 130 may be configured to provide customer service for the customers 101. The customer service center 130 may be configured to provide customer service for the customers 101 based on various customer service support functions supported by the customer service center 130. For example, customer service support functions may include customer communication functions for supporting communications with customers 101, customer information management functions for managing (e.g., collecting, maintaining, accessing, and the like) customer information for supporting customer service for the customers 101 (e.g., account information, preference information, and the like), customer service functions (e.g., customer care functions, customer experience management functions, and the like), and so forth. It will be appreciated that the customer service support functions supported by the customer service center 130 may vary across entities (e.g., based on entity types of the entities, customer service contexts of the entities, and the like), may vary across customers 101, and so forth. The customer service center 130 may be configured to support customer service support functions based on various communication types which may be used by the customers 101 (e.g., text-based communications, audio-based communications, video-based communications, and so forth). The customer service center 130 may be configured to support various other functions for providing customer service for the customers 101.

For example, where the entity is a telecommunications service provider and the customers 101 use telecommunications services of the telecommunications service provider, the customer service support functions supported by the customer service center 130 may include telecommunications service technical support functions. For example, telecommunications service technical support functions may include technical support for telecommunications services (e.g., problems accessing or using the service), technical support for devices via which customers 101 access telecommunications services (e.g., customer devices 110 or other devices), and so forth.

For example, where the entity is an end user device provider and the customers 101 purchase or rent end user devices (e.g., desktop computers, laptop computers, tablet computers, smartphones, and the like), the customer service support functions supported by the customer service center 130 may include end user device technical support functions. For example, end user device technical support functions may include technical support for issues with end user devices (e.g., problems with network connectivity, problems with software updates, and so forth).

For example, where the entity is an e-commerce company that sells products online, the customer service support functions supported by the customer service center 130 may include product support functions. For example, product support functions may include support for finding products of interest, support for researching products of interest, support for ordering products, support for tracking delivery of products, support for issues with products, support for returning or exchanging products, and so forth.

It will be appreciated that the foregoing examples represent merely a few of the types of entities for which the customer service center 130 may provide customer service to the customers 101.

The customer service center 130 includes customer service agents 131 which may provide customer service to the customers 101 based on various customer service support functions supported by the customer service center 130. The customer service agents 131 may provide customer service to the customers 101 via customer service conversations which may be conducted between the customer service agents 131 and the customers 101 for purposes of providing customer service to the customers 101 (e.g., audio-based conversations via voice calls, text-based conversations via text-based chat interfaces, and the like). The customer service agents 131 may include a set of human customer service agents 131-H which may interact with customers 101 using customer service agent terminals 132 and a set of automated customer service agents 131-A. The customer service agents 131 may be able to communicate with the customers 101 using various types of communications (e.g., audio, text, video, and so forth).

The human customer service agents 131-H, as indicated above, may interact with the customers 101 to provide customer service functions for the customers 101. The human customer service agents 131-H interact with the customers 101 using the customer service agent terminals 132. The customer service agent terminals 132 may include any devices and capabilities which may be used by the human customer service agents 131-H to interact with customers 101. For example, for text-based interaction between the human customer service agents 131-H and the customers 101, the customer service agent terminals 132 may be configured to enable the human customer service agents 131-H to accept chat sessions initiated by customers 101, view chat messages sent by customers 101, send chat messages to customers 101, add other customer service agents 131 to chat sessions with customers 101, and so forth. For example, for voice-based interaction between the human customer service agents 131-H and the customers 101, the customer service agent terminals 132 may be configured to enable the human customer service agents 131-H to view calls in a queue of pending calls to be handled, select calls to answer calls of customers 101, interact with customers 101 verbally, terminate calls with customers 101, add other customer service agents 131 to calls, transfer calls of customers 101 to other customer service agents 131, and so forth. For example, the customer service agent terminals 132 may include workstations, computers, smartphones, applications (e.g., running on physical devices or resources, virtual resources (e.g., virtual machines (VMs), virtual containers (VCs), and the like), and the like), and so forth. It will be appreciated that references herein to functions performed by a customer service agent 131, in the case of a human customer service agent 131-H, may be performed by one or more elements on behalf of the human customer service agent 131-H (e.g., by the customer service agent terminal 132 or other devices or elements). The human customer service agents 131-H may provide various other customer service functions for the customers 101.

The automated customer service agents 131-A, as indicated above, may interact with the customers 101 to provide customer service functions for the customers 101. The automated customer service agents 131-A may be automated in various ways based on various automation technologies. The automated customer service agents 131-A may be based on artificial intelligence (AI). The automated customer service agents 131-A may be chatbots. For example, the automated customer service agents 131-A may include chatbots configured to communicate with customers 101 using audio, text, and so forth. For example, the automated customer service agents 131-A may include chatbots which may have audio-based interfaces, text-based interfaces, video-based interfaces, and so forth. The automated customer service agents 131-A may be provided using physical devices or resources, virtual resources (e.g., VMs, VCs, and the like), and so forth. It will be appreciated that references herein to functions performed by a customer service agent 131, in the case of an automated customer service agent 131-A, may be performed by the automated customer service agent 131-A, by one or more elements on behalf of the automated customer service agent 131-A, and so forth. The automated customer service agents 131-A may provide various other customer service functions for the customers 101.

The customer service center 130 includes a customer service automation support system 135 that is configured to support automation of customer service provided to the customers 101 by the customer service agents 131 of the customer service center 130. The customer service automation support system 135 may be configured to support automation of customer service based on analysis of customer service conversation records for customer service conversations between customers 101 and customer service agents 131. The customer service automation support system 135 may be configured to support automation of customer service by obtaining customer service conversation records for customer service conversations between customers 101 and customer service agents 131, analyzing the customer service conversation records for the customer service conversations between the customers 101 and the customer service agents 131 for determining a quantitative ranking of topics discussed in the customer service conversations between the customers 101 and the customer service agents 131, and initiating a management action related to the customer service provided to the customers 101 by the customer service agents 131 based on the quantitative ranking of topics discussed in the customer service conversations between the customers 101 and the customer service agents 131. An example method for use by the customer service automation support system 135 to support automation of customer service based on analysis of customer service conversation records for customer service conversations between customers 101 and customer service agents 131 is presented in FIG. 2. It will be appreciated that the customer service automation support system 135 may be configured to support various other functions for supporting automation of customer service based on analysis of customer service conversation records for customer service conversations between customers 101 and customer service agents 131.

The customer service automation support system 135 obtains customer service conversation records for customer service conversations between customers 101 and customer service agents 131. The customer service conversation records for customer service conversations between customers 101 and customer service agents 131 may be captured by the one or more elements of the customer service center 130 (e.g., recording and storing audio conversations, capturing and storing text-based conversations, and so forth) such that the customer service conversation records are available to customer service automation support system 135. The customer service conversation records may include audio-based records (e.g., for voice-based conversations between the customers 101 and the customer service agents 131), text-based records (e.g., for text-based conversations between the customers 101 and the customer service agents 131), and so forth. The customer service conversation records may include conversations between customers 101 and customer service agents 131 that may include non-topic-related utterances (e.g., greetings, chitchat, and so forth), topic-related utterances related to various topics which may be discussed within the context of the customer service agents 131 providing customer service to the customers 101, and so forth. For example, non-topic-related utterances may include statements such as 'Hello, how can I help you today,' 'Please hold for one moment,' 'Thank you for your patience,' and the like. For example, topic-related utterances may include phrases related to customer service topics (e.g., 'Please give me a moment to access your account,' 'I am having trouble accessing the Internet,' 'I am having a hard time locating a product,' 'I would like to pay my outstanding balance,' and the like), words related to customer service topics (e.g., 'account,' 'modem,' 'router,' 'phone,' 'product,' 'payment,' and the like), and so forth. As discussed further below, the topics which may be discussed within the customer service conversations between the customers 101 and the customer service agents 131 may include conversation-level topics, utterance-level topics, and so forth. It will be appreciated that the customer service conversations between customers 101 and customer service agents 131 may include various other utterances and conversations related to various other topics which may be discussed in a customer service context.

The customer service automation support system 135 analyzes the customer service conversation records for the customer service conversations between the customers 101 and the customer service agents 131 to extract topics from the customer service conversations between the customers 101 and the customer service agents 131, analyze topics extracted from the customer service conversations between the customers 101 and the customer service agents 131, determine quantitative rankings of topics extracted from the customer service conversations between the customers 101 and the customer service agents 131, and so forth. As discussed further below, the analysis of the customer service conversation records for the customer service conversations between the customers 101 and the customer service agents 131 that is performed by the customer service automation support system 135 may be different for conversation-level topics and utterance-level topics.

In one example, customer service conversations between the customers 101 and the customer service agents 131 may include conversation-level topics. A conversation-level topic of a customer service conversation may be a topic that is identified based on analysis of a set of utterances in a customer service conversation record of the customer service conversation. The quantitative ranking of the conversation-level topics from the customer service conversations between the customers 101 and the customer service agents 131 may be determined based on generation of conversational documents (e.g., including topic-related utterances from the customer service conversations between the customers 101 and the customer service agents 131 and excluding non-topic-related utterances from the customer service conversations between the customers 101 and the customer service agents 131), processing of the conversational documents to provide conversational document representations of the conversational documents (e.g., based on use of neural networks, clustering of the conversational document representations to form clusters representing groups of customer service conversations having one or more topics in common (e.g., based on a clustering algorithm), analysis of the clusters to identify conversation-level topics of the clusters (e.g., based on analysis of the sets of conversational document representations in the clusters using one or more topic extraction algorithms)), and determination of the quantitative ranking of the conversation-level topics associated with the clusters (e.g., based on cluster sizes of the clusters or other quantitative ranking criteria). The quantitative ranking of the conversation-level topics from the customer service conversations may be determined based on dividing of the set of customer service conversation records into a set of clusters where each cluster in the set of clusters represents a respective group of the customer service conversation records having a respective conversation-level topic in common, determination of a set of primary conversation-level topics for the set of customer service conversation records from the set of clusters (e.g., one primary conversation-level topic per cluster, fewer or more than one primary conversation-level topic per cluster, and so forth), and determination of the quantitative ranking of the primary conversation-level topics for the set of customer service conversation records. It is noted that the primary conversation-level topic(s) determined from a given cluster may be the same as or different than the conversation-level topic in common which caused the grouping of that subset of the customer service conversation records to form the given cluster. The quantitative ranking of the conversation-level topics from the customer service conversations between the customers 101 and the customer service agents 131 may be determined based on various other types of capabilities, analysis, algorithms, models, criteria, and so forth. In one example, the quantitative ranking of the conversation-level topics from the customer service conversations between the customers 101 and the customer service agents 131 may be determined as presented with respect to FIG. 3.

In one example, customer service conversations between the customers 101 and the customer service agents 131 may include utterance-level topics. An utterance-level topic of a customer service conversation may be a topic that is identified based on analysis of a set of words or phrases in an utterance in a customer service conversation record of a customer service conversation. The quantitative ranking of the utterance-level topics from the customer service conversations between the customers 101 and the customer service agents 131 may be determined on a per-conversation-level topic basis for one or more conversation-level topics identified based on processing of the customer service conversations between the customers 101 and the customer service agents 131 (e.g., based on analysis of the conversational document representations, or customer service conversations represented by the conversational document representations, of the cluster of the conversation-level topic for which the utterance-level topics are being identified and quantitatively ranked). The quantitative ranking of the utterance-level topics from the customer service conversations between the customers 101 and the customer service agents 131 may be determined based on obtaining, from a cluster of customer service conversations associated with a conversation-level topic, a set of utterances associated with the conversation-level topic, obtaining a set of keywords associated with the conversation-level topic (e.g., a business-specific vocabulary related to the conversation-level topic) based on the conversation-level topic and from a source different than the respective set of utterances of the respective cluster of customer service conversations associated with the conversation-level topic, extracting a set of phrases (e.g., a set of business-specific phrases) from the set of utterances associated with the conversation-level topic based on the set of keywords, extracting the set of utterance-level topics from the set of utterances associated with the conversation-level topic based on the set of phrases, and determining the quantitative ranking of the utterance-level topics in the set of utterance-level topics. The quantitative ranking of the utterance-level topics from the customer service conversations between the customers 101 and the customer service agents 131 may be determined based on various other types of analysis, algorithms, models, criteria, and so forth. In one example, the quantitative ranking of the utterance-level topics from the customer service conversations between the customers 101 and the customer service agents 131 may be determined as presented with respect to FIG. 4.

It will be appreciated that the types of utterances and topics which may be included within, and identified from, a customer service conversation record for a customer service conversation between one of the customers 101 and one of the customer service agents 131 may be further understood with respect to a specific example. For example, if a customer 101 calls in to resolve a problem with his or her credit card billing information, the customer 101 and the customer service agent 131 may first greet each other (a non-topic-related utterance), the customer 101 may indicate a need to correct credit card billing information, the customer service agent 131 may verify the account information of the customer 101, the customer service agent 131 may verify the customer name of the customer 101, the customer service agent 131 may verify the credit card information of the customer 101, and the customer service agent 131 may then help the customer 101 by correcting the credit card information of the customer 101. Here, the main topic of the customer service conversation record, which may be a candidate to be a conversation-level topic (e.g., based on clustering of this customer service conversation with other customer service conversations also determined to be related to this main topic), may be "correct credit card billing information" or something similar. Here, the customer service conversation record also includes other topics, some of which are directly related to the main topic (and, thus, which may be candidates to represent the conversation-level topic and which also may be candidates to be utterance-level topics associated with the conversation-level topic) and some of which are unrelated to the main topic (and, thus, which may not be candidates to be utterance-level topics associated with the main topic). For example, at least portions of the utterances related to the need to correct credit card billing information, verification of the name of the customer 101, verification of the credit card information of the customer 101, and correction of the credit card information of the customer 101 may be considered to be directly related to the main topic. For example, at least a portion of the utterance related to verification of the account information of the customer 101 may be considered to be unrelated to the main topic (e.g., since this type of verification may be performed for all interactions between customers and customer service agents 131 such that it may not be considered to be useful in identifying a conversation-level topic and may or may not be considered to be useful in identifying utterance-level topics associated with the conversation-level topic). It will be appreciated that, since the above example is merely a single customer service conversation record, and identification and quantitative ranking of conversation-level topics may be performed based on clustering of multiple customer service conversations of multiple customer service conversation records, the determination as to which of the utterances in the customer service conversation record are related to candidate topics of interest and which are unrelated to candidate topics of interest may depend on processing of the customer service conversation record in combination with other customer service conversation records related to customer service conversations which are clustered based on identification of common topics.

The customer service automation support system 135, based on analysis of customer service conversation records for customer service conversations between customers 101 and customer service agents 131, initiates a management action related to the customer service provided to the customers 101 by the customer service agents 131. As discussed further below, the management action that is initiated by the customer service automation support system 135 may be different for conversation-level topics and utterance-level topics.

In one example, the management action may include providing a quantitative ranking of topics from the customer service conversations between the customers 101 and the customer service agents 131 (e.g., a quantitative ranking of conversation-level topics, a quantitative ranking of utterance-level topics, and so forth). The providing of the quantitative ranking of topics from the customer service conversations between the customers 101 and the customer service agents 131 may include storing the quantitative ranking of the topics from the customer service conversations (e.g., such that the quantitative ranking may be accessed by various personnel, such as customer service center automation personnel, for various purposes), displaying the quantitative ranking of the topics from the customer service conversations (e.g., to various personnel, such as customer service center automation personnel, such that the quantitative ranking may be used for various purposes), sending the quantitative ranking of the topics from the customer service conversations to one or more devices (e.g., one or more management systems, one or more end user devices of various personnel such as customer service center automation personnel, and the like), and the like.

In one example, the management action may include generating content based on analysis of customer service conversation records for customer service conversations between customers 101 and customer service agents 131. The content may be generated based on a quantitative ranking of topics from the customer service conversations between the customers 101 and the customer service agents 131. The content that is generated may include one or more reports presenting results of the analysis of the customer service conversation records (e.g., presenting a quantitative ranking of the topics from the customer service conversations for enabling personnel to visualize the quantitative ranking of the topics from the customer service conversations), one or more recommendations determined based on the analysis of customer service conversation records (e.g., a recommendation to create a chatbot to automate a particular conversation-level topic, a recommendation to address a problem, a recommendation regarding particular functions that should be supported by a chatbot to address particular utterance-level topics, and the like), one or more software programs automatically created based on the analysis of customer service conversation records and which may be used to automate one or more customer service functions (e.g., one or more chatbot programs, software modules, and the like), one or more alerts generated based on the analysis of customer service conversation records (e.g., alerts which may identify problems or potential problems with products or services, alerts which may identify problems or potential problems with aspects of customer service, alerts indicative of major problems encountered, alerts indicative of newly identified customer issues, alerts indicative of changes in issue trends, and the like), and so forth.

In one example, the management action may include supporting a customer service center automation initiative. The customer service center automation initiative may be supported by providing a recommendation for a customer service center automation initiative, automatically initiating a customer service center automation initiative, and so forth.

In one example, where the topics are conversation-level topics, the customer service center automation initiative may include providing a chatbot. The chatbot may be provided for one of the conversation-level topics based on a quantitative ranking of the conversation-level topics from the customer service conversations between the customers 101 and the customer service agents 131 (e.g., the conversation-level topic having the highest ranking). Here, the quantitative ranking of the conversation-level topics from the customer service conversations between the customers 101 and the customer service agents 131 provides a list of repetitive topics that are discussed relatively often during conversations between the customers 101 and the customer service agents 131 and, thus, which are good candidates for automation based on development of new chatbots that can automate handling of those topics and can therefore provide more efficient and cost-effective customer support for the customers 101. In other words, this enables determination of which types of customer service conversation topics should have the highest automation priority, thereby supporting prioritization of chatbot development for supporting customer service for the customers 101. For example, if the most commonly discussed conversation-level topic identified in the customer service conversations between the customers 101 and the customer service agents 131 is the topic of troubleshooting problems with a wireless router, then a chatbot that is able to automate this function for customers 101 may be developed and deployed within customer service center 130 to improve the automation of customer service for the customers 101.

In one example, where the topics are utterance-level topics, the customer service center automation initiative may include supporting design of a chatbot. The design of the chatbot may be based on one or more of the utterance-level topics in a quantitative ranking of the utterance-level topics from the customer service conversations between the customers 101 and the customer service agents 131 (e.g., one or more of the utterance-level topics having the highest ranking(s)). Here, the quantitative ranking of the utterance-level topics from the customer service conversations between the customers 101 and the customer service agents 131 provides a list of repetitive topics that are uttered relatively often during customer service conversations between the customers 101 and the customer service agents 131 and, thus, which may be used to support the design and development of a chatbot for the conversation-level topic with which the utterance-level topics are associated. It is noted that, while a conversation-level topic may be used to decide on a type of chatbot which may be developed to automate handling of that conversation-level topic, the conversation-level topic may not necessarily provide an indication of specific topics to be handled for the various utterances which might be exchanged between the customers 101 and the customer service agents 131 within the context of that conversation-level topic; however, the identification and ranking of the utterance-level topics within that conversation-level topic may be used as a basis (e.g., roadmap) for designing the chatbot for that conversation-level topic (e.g., designing the chatbot to handle specific ones of the utterance-level topics in order to provide overall support for the conversation-level topic). In other words, this enables determination of design aspects of the conversational dialog of a chatbot to support specific types of functions for the conversational topic for which the chatbot is provided, thereby supporting prioritization of chatbot development for supporting customer service for the customers 101. For example, if the most commonly discussed utterance-level topics identified in the customer service conversations between the customers 101 and the customer service agents 131 include utterances of "port" and "connection" within the context of the conversation-level topic of troubleshooting problems with a wireless router, then the design of the chatbot to automate this function for customers 101 (where, as indicated above, the chatbot may be developed and deployed within customer service center 130 to improve the automation of customer service for the customers 101) may include designing the chatbot to interact with the customer 101 to verify the port of the wireless router and to interact with the customer 101 to verify the connections of the wireless router, respectively.

In one example, the management action may include initiating a customer service automation action. The customer service automation action may include providing a recommendation for a chatbot to be created or automatically creating the chatbot (e.g., a chatbot configured to handle a particular conversation-level topic where the particular conversation-level topic is selected based on a quantitative ranking of conversation-level topics), providing a recommendation for a chatbot to be created and for a design for the chatbot or automatically creating a chatbot having a particular design (e.g., a chatbot configured to handle a particular conversation-level topic where the particular conversation-level topic is selected based on a quantitative ranking of conversation-level topics and configured to support tasks related to particular utterance-level topics where such utterance-level topics may be selected based on a quantitative ranking of utterance-level topics associated with the particular conversation-level topic), and so forth. It will be appreciated that automated creation of a chatbot or other software may be based on various artificial intelligence (AI) techniques and/or use of other techniques or capabilities configured to support automated software creation.

In one example, the management action may include identification of problems associated with the basis for which customer service is provided (e.g., problems associated with products where the entity for which customer service is provided is a product provider, problems associated with services where the entity for which customer service is provided is a service provider, and so forth). This management action may be initiated where the topics are conversation-level topics. The conversation-level topics determined to be discussed most frequently in the customer service conversations between the customers 101 and the customer service agents 131 may be indicative of problems. For example, for a smartphone provider, where the most frequently discussed topic relates to problems with battery life of a particular model of the smartphone, the inclusion of this topic at the top of the quantitative rankings of the conversation-level topics from the customer service conversations between the customers 101 and the customer service agents 131 may trigger identification of battery life limitations as an urgent problem that should be addressed by the smartphone provider. For example, for an e-commerce company, where the most frequently discussed topic relates to problems associated with a shopping cart page, the inclusion of this topic at the top of the quantitative rankings of the conversation-level topics from the customer service conversations between the customers 101 and the customer service agents 131 may trigger identification of the design of the shopping cart page as an urgent problem that should be addressed by the e-commerce company. It will be appreciated that problems may be identified in various ways, various other problems may be identified, and so forth.

In one example, the management action may include detection and monitoring of trends associated with the basis for which customer service is provided (e.g., trends associated with products where the entity for which customer service is provided is a product provider, trends associated with services where the entity for which customer service is provided is a service provider, and so forth). This management action may be initiated where the topics are conversation-level topics. The conversation-level topics determined to be discussed most frequently in the customer service conversations between the customers 101 and the customer service agents 131 may change over time and the tracking of the conversation-level topics over time may enable detection and monitoring of trends in the conversation-level topics over time. For example, for a smartphone provider, where battery life limitations were not previously identified as a relatively common topic of discussion in customer service conversations between the customers 101 and the customer service agents 131, but then begin to appear at or near the top of the quantitative rankings of the conversation-level topics after release of a new model of smartphone, the smartphone provider may identify this trend change as being indicative of a problem with the battery of the new smartphone model. For example, for an e-commerce company, where a shopping cart page has been identified as an urgent problem that should be addressed by the e-commerce company, the e-commerce company may redesign the shopping cart page and continue to monitor the conversation-level topics over time to determine whether the redesign of the shopping cart page has solved the problem (e.g., if the shopping cart page continues to be at the top of the quantitative rankings of the conversation-level topics then the e-commerce company can determine that the redesign probably did not solve the problem, but if the shopping cart page drops out of the top of the quantitative rankings of the conversation-level topics then the e-commerce company can determine that the redesign probably solved the problem). It will be appreciated that trends may be detected and tracked in various ways, various other trends may be detected and tracked, and so forth.

It will be appreciated that various other management actions may be initiated based on analysis of customer service conversation records of the customer service conversations between the customers 101 and the customer service agents 131.

It will be appreciated that various combinations of such management actions may be initiated. It will be appreciated that various combinations of such management actions may be initiated in various ways (e.g., serially, in parallel, and so forth).

The customer service automation support system 135, as indicated above, may be configured to process customer service conversation records to support various customer service automation functions for supporting automation of customer service for customers 101. This is illustrated in FIG. 1 as customer service conversation records 136 available to the customer service automation support system 135 and which may be processed by the customer service automation support system 135, based on customer service automation inputs 137, to produce customer service automation outputs 138 maintained by the customer service automation support system 135.

The customer service automation inputs 137 may include any inputs which may be used by the customer service automation support system 135 for processing the customer service conversation records 136 to produce the customer service automation outputs 138. For example, the customer service automation inputs 137 may include topic extraction algorithms, topic extraction models, neural feature extraction algorithms, set of keywords associated with conversation-level topics (e.g., different sets of keywords for different conversation-level topics), sets of keywords associated with utterance-level topics (e.g., different sets of keywords for different utterance-level topics), and so forth.

The customer service automation outputs 138 may include any outputs which may be produced by the customer service automation support system 135 based on processing of the customer service conversation records 136. For example, the customer service automation outputs 138 may include lists of topics determined by the customer service automation support system 135 (e.g., conversation-level topics (e.g., topics in common, primary topics, and so forth), utterance-level topics, and so forth), quantitative rankings of topics determined by the customer service automation support system 135, content generated by the customer service automation support system 135 based on list of topics and/or quantitative rankings of topics, outputs used for management actions initiated by the customer service automation support system 135, outputs generated as a result of management actions initiated by the customer service automation support system 135, and so forth.

It will be appreciated that, although omitted for purposes of clarity, the customer service automation support system 135 may be configured to maintain or control various other types of information (e.g., various other input information in addition to the customer service conversation records 136, various intermediate information which may be produced based on processing of the customer service conversation records 136, various other types of outputs in addition to the customer service automation outputs 138, various programs which may be executed by customer service automation support system 135 to provide various customer service automation support functions (e.g., various programs which may be configured to support processing of the customer service conversation records 136 for identification and quantitative ranking of topics, various programs which may be configured to support management actions which may be initiated based on processing of the customer service conversation records 136 for identification and quantitative ranking of topics, various programs which may be configured to support generation and/or analysis of customer service automation outputs 138, and the like), and so forth.

The customer service automation support system 135 may be configured to support various conversation monitoring functions. The customer service automation support system 135 may be configured to support continuous monitoring of conversational topics so that if there is any change in the topic distribution or any new topic or customer issues emerge, one or more management actions may be initiated (e.g., providing a notification to an automation team or a customer service team, automatically generating software which may be executed to address the emerging topic or issue, and so forth). The customer service automation support system 135 may be configured to support continuous monitoring of conversational topics by determining, for a new customer service conversation record that is received (e.g., obtained as text or obtained as audio and translated to text through a "speech-to-text" module), whether the new customer service conversation record belongs to any existing clusters of customer service conversation records. The manner in which this determination is performed may depend on the manner in which the clustering of the customer service conversation records is performed. For example, where the clustering of the customer service conversation records is performed using K-means clustering as the clustering algorithm, then, after training, the clustering algorithm generates a set of K conversational cluster centers of the clusters and determines respective distances of the new customer service conversation record to the respective centers of the K conversational cluster centers of the clusters. If the respective distances of the new customer service conversation record to the respective centers of the K conversational cluster centers of the clusters are all greater than a threshold, then the new customer service conversation record is not considered to belong to any of the existing clusters of customer service conversation records and one or more appropriate management actions may be initiated (e.g., creating a new cluster, raising one or more alerts, and so forth). If any of the respective distances of the new customer service conversation record to the respective centers of the K conversational cluster centers of the clusters is less than a threshold, then the current conversation-level topic distribution vector may be updated. The current conversation-level topic distribution vector may be updated using a multivariate anomaly detection algorithm (e.g., a multivariate change point detection algorithm or other suitable algorithm) that can determine if the current conversational-level topic distribution vector has a significant difference from the previous conversational-level topic distribution vector. If the current conversational-level topic distribution vector has a significant difference from the previous conversational-level topic distribution vector (e.g., measured based on a threshold or other suitable basis), one or more appropriate management actions may be initiated (e.g., raising one or more alerts indicative that there is a change in the topic distribution and so forth).

It will be appreciated that the customer service automation support system 135 may be configured to support various other functions for supporting automation of customer service provided to customers 101 by the customer service center 130.

It will be appreciated that the customer service center 130 may be configured to support various other functions for supporting automation of customer service for customers 101.

It will be appreciated that the system 100 has been simplified and, thus, may be implemented in a different form than that which is illustrated in FIG. 1. For example, system 100 may include additional elements (e.g., networks, devices, and so forth), omit various elements, substitute elements for elements or devices that perform the same or similar functions, combine elements which are illustrated as separate elements, implement elements as functions that are spread across several elements that operate collectively as the respective elements, and so forth, without altering the scope of the present disclosure. It will be appreciated that the system 100 may be modified in various other ways while still supporting automation of customer service for customers 101 of customer service center 130 in accordance with the present disclosure. Thus, these and other modifications are contemplated within the scope of the present disclosure.

It will be appreciated that various functions for supporting automation of customer service based on analysis of customer service conversations as discussed within the context of system 100 of FIG. 1 may be further understood by way of reference to FIGS. 2-5, which may be implemented independently or in various combinations.

Figure 2:
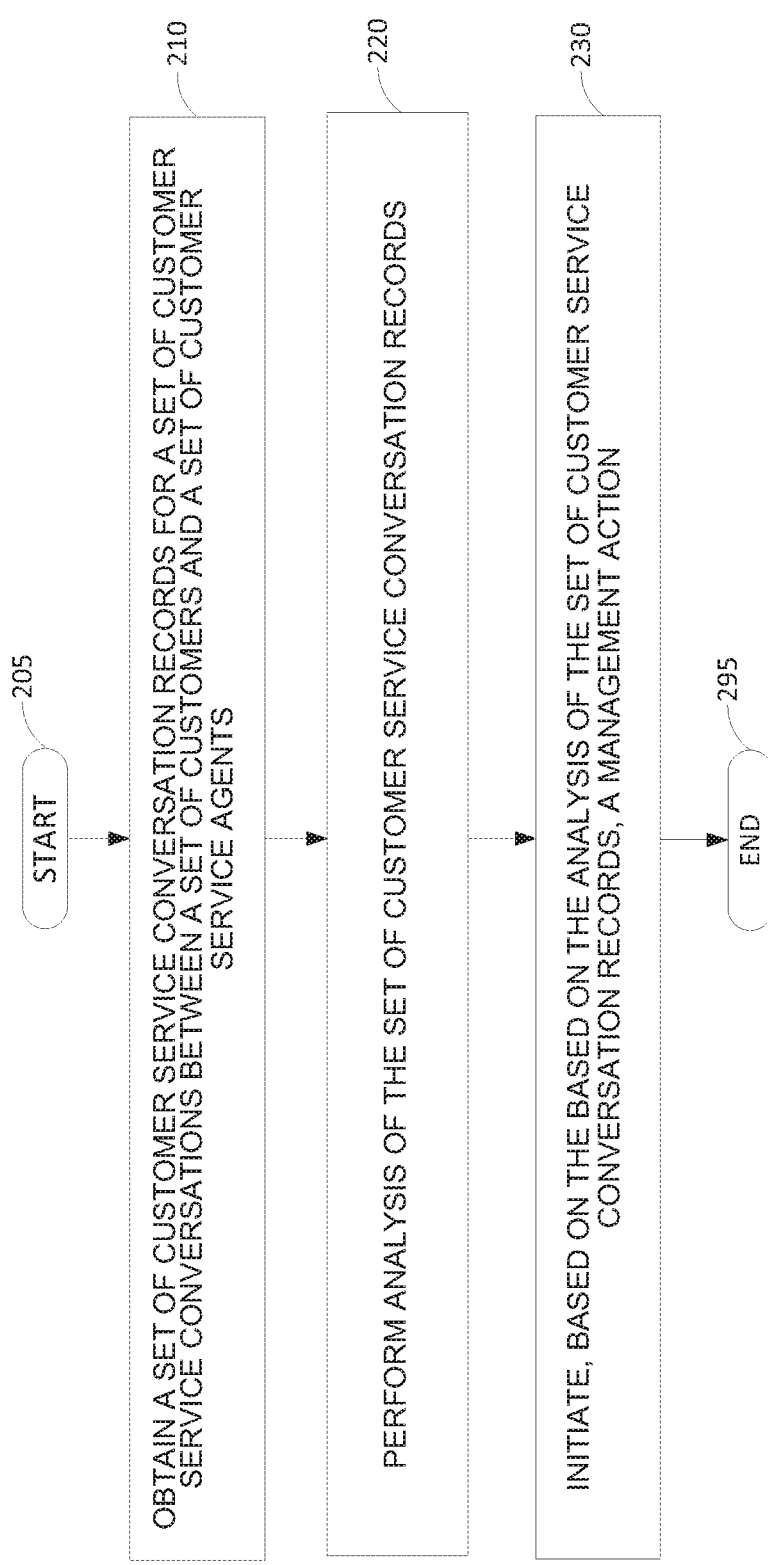
FIG. 2 illustrates a flowchart of an example method for supporting automation of customer service based on analysis of customer service conversations between customers and customer service agents.

FIG. 2 illustrates a flowchart of an example method for supporting automation of customer service based on analysis of customer service conversations between customers and customer service agents. In one example, the method 200 is performed by one or more components of the system 100 of FIG. 1 (e.g., customer service automation support system 135), one or more elements (e.g., a processor, or processors, performing operations stored in and loaded from a memory) of one or more components of the system 100 of FIG. 1, one or more components of the system 100 of FIG. 1 in conjunction with one or more other devices, and so forth. In one example, the steps, functions, and/or operations of method 200 may be performed by a computing system 600 as described in connection with FIG. 6. For instance, the computing system 600 may represent any one or more components of the system 100 of FIG. 1, or portion(s) thereof, which is/are configured to perform the steps, functions, and/or operations of the method 200. Similarly, in one example, the steps, functions, and/or operations of the method 200 may be performed by a processing system including one or more computing devices collectively configured to perform various steps, functions, and/or operations of the method 200 (e.g., multiple instances of the computing system 600 may collectively function as a processing system for performing various steps, functions, and/or operations of the method 200). It will be appreciated that the method 200 may be provided in various other ways.

As illustrated in FIG. 2, the method 200 begins in step 205 and proceeds to step 210.

At step 210, the processing system may obtain a set of customer service conversation records for a set of customer service conversations between a set of customers and a set of customer service agents. The customer service conversations may be related to customer service provided to the customers by the customer service agents. The customer service conversation records may include audio records of voice conversations, text records of text-based conversations, and so forth.

At step 220, the processing system may perform an analysis of the set of customer service conversation records. The analysis of the set of customer service conversation records may include identification of topics from the set of customer service conversation records (e.g., conversation-level topics identified from the respective customer service conversation records, conversation-level topics identified based on clustering of the set of customer service conversation records into clusters, primary conversation-level topics identified based on clustering of the set of customer service conversation records into clusters, utterance-level topics identified from the respective customer service conversation records, utterance-level topics identified based on clustering of the set of customer service conversation records into clusters, and so forth). The analysis of the set of customer service conversation records may include determining a quantitative ranking of a set of topics from the set of customer service conversations, where the set of topics from the set of customer service conversations may include a set of conversation-level topics, a set of utterance-level topics, and so forth. In one example, the quantitative ranking of the set of topics from the set of customer service conversations, for a set of conversation-level topics, may be determined as presented with respect to FIG. 3 (although it will be appreciated that various operations of FIG. 3 also may be used for other types of analysis of the set of customer service conversation records). In one example, the quantitative ranking of the set of topics from the set of customer service conversations, for a set of utterance-level topics, may be determined as presented with respect to FIG. 4 (although it will be appreciated that various operations of FIG. 4 also may be used for other types of analysis of the set of customer service conversation records). It will be appreciated that the quantitative ranking of the set of topics from the set of customer service conversations may be determined in other ways. It will be appreciated that the processing system may analyze the set of customer service conversation records in various other ways, may analyze the set of customer service conversation records to produce various other outputs, and so forth.

At step 230, the processing system may initiate, based on the analysis of the set of customer service conversation records, a management action. The management action that is initiated may depend on the type of analysis performed on the set of customer service conversation records, the output or outputs of the analysis of the set of customer service conversation records, and so forth. The management action that is initiated may include providing results of the analysis of the set of customer service conversation records (e.g., sending the results to one or more devices, causing the results to be presented, and so forth), generating information based on results of the analysis of the set of customer service conversation records (e.g., generating one or more recommendations for actions to be performed, generating software, and so forth), and so forth.

As illustrated in FIG. 2, following step 230, the method 200 proceeds to step 295 where the method 200 ends.

It will be appreciated that the method 200 may be expanded to include additional steps, or may be modified to replace steps with different steps, to combine steps, to omit steps, to perform steps in a different order, and so forth. For instance, in one example the processing system may repeat one or more steps of the method 200 (e.g., obtaining and processing additional customer service conversation records for purposes of supporting various functions which may be supported based on analysis of the customer service conversations of the customer service conversation records). Thus, it will be appreciated that these and other modifications are all contemplated within the scope of the present disclosure.

Figure 3:
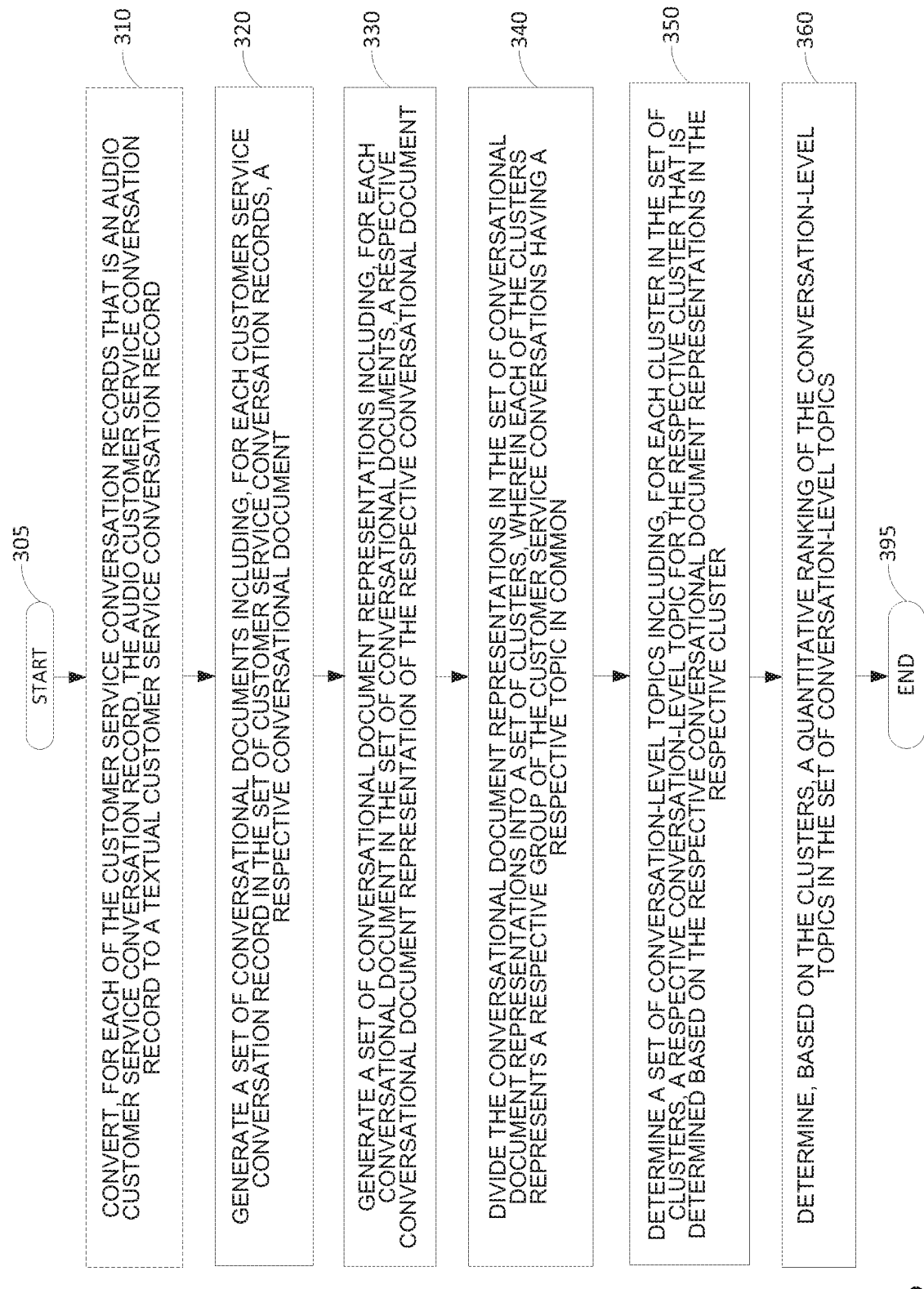
FIG. 3 illustrates a flowchart of an example method for determining a quantitative ranking of conversation-level topics from customer service conversations between customers and customer service agents.

FIG. 3 illustrates a flowchart of an example method for determining a quantitative ranking of conversation-level topics from customer service conversations between customers and customer service agents. The method 300 may be configured to support conversation-level repetitive topic extraction and ranking. In one example, the method 300 is performed by one or more components of the system 100 of FIG. 1 (e.g., customer service automation support system 135), one or more elements (e.g., a processor, or processors, performing operations stored in and loaded from a memory) of one or more components of the system 100 of FIG. 1, one or more components of the system 100 of FIG. 1 in conjunction with one or more other devices, and so forth. In one example, the steps, functions, and/or operations of method 300 may be performed by a computing system 600 as described in connection with FIG. 6 below. For instance, the computing system 600 may represent any one or more components of the system 100 of FIG. 1, or portion(s) thereof, which is/are configured to perform the steps, functions, and/or operations of the method 300. Similarly, in one example, the steps, functions, and/or operations of method 300 may be performed by a processing system including one or more computing devices collectively configured to perform various steps, functions, and/or operations of the method 300 (e.g., multiple instances of the computing system 600 may collectively function as a processing system for performing various steps, functions, and/or operations of the method 300). It will be appreciated that the method 300 may be provided in various other ways.

As indicated above, method 300 of FIG. 3 may be performed as, or as part of, step 220 of FIG. 2 for conversation-level topics. Accordingly, prior to execution of method 300, it is assumed that the processing system has obtained a set of customer service conversation records, for a set of customer service conversations between a set of customers and a set of customer service agents (e.g., as described with respect to step 210 of method 200 of FIG. 2 or in any other suitable manner), which may be processed as described with respect to method 300 of FIG. 3 for determining a quantitative ranking of conversation-level topics from the customer service conversations between customers and customer service agents. Accordingly, it will be appreciated that step 210 may be incorporated within method 300 of FIG. 3 and, similarly, that various steps of method 300 of FIG. 3 may be included within method 200 of FIG. 2.

As illustrated in FIG. 3, the method 300 begins in step 305 and proceeds to step 310.

At step 310, which is an optional step, the processing system may convert, for each of the customer service conversation records that is an audio customer service conversation record, the audio customer service conversation record to a textual customer service conversation record. The conversion of the audio customer service conversation record(s) to textual customer service conversation record(s) may be performed using one or more audio-to-text conversion programs or capabilities. It will be appreciated that this conversion may be performed for any audio customer service conversation records included in the set of customer service conversation records (e.g., where some or all of the customer service conversations between the customers and the customer service agents are voice calls), but would not be performed where each of the customer service conversation records included in the set of customer service conversation records is a textual customer service conversation record (e.g., where the customer service conversations between the customers and the customer service agents are text-based conversations via chat interfaces).

At step 320, the processing system may generate a set of conversational documents including, for each customer service conversation record in the set of customer service conversation records, a respective conversational document. The conversational document for a customer service conversation record may include a set of topic-related utterances from the customer service conversation. In one example, in which the customer service conversation records include topic-related utterances (e.g., associated with topics related to the customer service provided to the customers by the customer service agents) and non-topic-related utterances (e.g., greetings, chitchat, and so forth), generation of the conversational documents may include performing pre-cleaning of the customer service conversation records to remove non-topic-related utterances such that only topic-related utterances remain. In one example, the processing system may generate the conversational document from a customer service conversation record by performing, based on the customer service conversation record, an utterance pre-cleaning operation for removing from the customer service conversation record one or more non-topic-related utterances of the respective customer service conversation and maintaining the topic-related utterances from the respective customer service conversation and concatenating the topic-related utterances from the respective customer service conversation to form thereby the respective conversational document for the respective customer service conversation record. In one example, utterance pre-cleaning for removing non-topic-related utterances while maintaining topic-related utterances may be provided by an utterance pre-cleaning module. It will be appreciated that, by filtering such "noisy" non-topic-related utterances that could have a negative impact on further processing of the information of the customer service conversation records for identification and ranking of topics for supporting customer service automation, further processing of the topic-related utterances of the customer service conversations for identification and quantitative ranking of topics for supporting customer service automation is thereby improved.

At step 330, the processing system may generate a set of conversational document representations including, for each conversational document in the set of conversational documents, a respective conversational document representation of the respective conversational document. In one example, the conversational document representations of the conversational documents may be neural representations of the conversational documents. In one example, the neural representations of the conversational documents may be lower-dimensional neural representations of the conversational documents. In one example, the neural representations of the conversational documents may be generated by training a deep neural network based on the conversational documents.

In one example, the conversational document representations may be generated based on feature extraction, such as based on use of a conversational neural feature extractor configured to perform feature extraction. It will be appreciated that the conversational document representations of the conversational documents may be generated in various other ways.

At step 340, the processing system may divide the conversational document representations in the set of conversational document representations into a set of clusters, wherein each of the clusters represents a respective group of the customer service conversations having a respective topic in common. In one example, the clustering of the conversational document representations into the clusters may be performed based on a clustering algorithm. In one example, the clustering of the conversational document representations into the clusters may be performed in a manner for grouping conversational document representations of conversational documents associated with customer service conversations having a respective topic in common, such that this also may be considered to be a clustering of the conversational documents associated with customer service conversations or a clustering of the customer service conversations. It will be appreciated that the topic in common for a given cluster of conversational document representations may or may not be the conversation-level topic that is ultimately identified for the cluster (e.g., based on use of topic modeling or extraction algorithms as discussed further below), since the various customer service conversations represented by the conversational document representations each may include utterances covering a range of topics. It will be appreciated that, since the customer service conversations each may include utterances covering a range of topics, the clustering of the conversational document representations of the conversational documents associated with the customer service conversations may be performed in a manner tending to support identification of conversation-level topics (e.g., selection of common topics as a basis for clustering may be based on knowledge about the topic modeling or extraction algorithms may be applied for identification of the conversation-level topics from various sets of topics covered in the various customer service conversations represented by the conversational document representations in the clusters, respectively) or may be performed independent of attempting to support identification of conversation-level topics (e.g., after the clusters are determined then topic modeling or extraction algorithms may be applied for identification of the conversation-level topics from various sets of topics covered in the various customer service conversations represented by the conversational document representations in the clusters, respectively).

At step 350, the processing system may determine a set of conversation-level topics including, for each cluster in the set of clusters, a respective conversation-level topic for the respective cluster that is determined based on the respective conversational document representations in the respective cluster.

In one example, the processing system may determine the conversation-level topics for the respective clusters based on one or more algorithms, models, and so forth. In one example, the processing system may determine the conversation-level topics for the respective clusters based on a topic extraction algorithm. In one example, the processing system may determine the conversation-level topics for the respective clusters based on a generative statistical model. In one example, the generative statistical model includes an LDA model. It will be appreciated that the processing system may determine the conversation-level topics for the respective clusters based on various other algorithms, models, and so forth.

In one example, for one or more of the clusters, the processing system may determine the conversation-level topic for the cluster based on processing of the respective conversational document representations in the respective cluster for identification of topic-related utterances in the customer service conversations (e.g., relatively important words or phrases) in the group of the customer service conversations having the respective topic in common for the respective cluster. Here, it is noted that, since each customer service conversation may include multiple topics, some of which are irrelevant to the main topic of the cluster and others which are relevant to the main topic of the cluster, filtering of topics which are irrelevant to the main topic of the cluster may result in identification of the topics that are relevant to the main topic of the cluster, which may then be further evaluated (e.g., based on a topic extraction algorithm, such as based on an LDA model) to determine the relevant topic that is considered to be the conversation-level topic for the customer service conversations represented by the conversational document representations in the respective cluster.

It will be appreciated that the set of conversation-level topics may represent the most repetitive conversation-level topics from the set of customer service conversation records of the customer service conversations.

At step 360, the processing system may determine, based on the clusters, a quantitative ranking of the conversation-level topics in the set of conversation-level topics. In one example, the quantitative ranking of the conversation-level topics in the set of conversation-level topics may be determined based on respective cluster sizes of the respective clusters with which the respective conversation-level topics are associated (e.g., larger cluster sizes may result in higher quantitative rankings of the respective conversation-level topics associated with the clusters and smaller cluster sizes may result in lower quantitative rankings of the respective conversation-level topics associated with the clusters). In one example, the quantitative ranking of the conversation-level topics in the set of conversation-level topics may be determined based on a distribution of the respective cluster sizes of the respective clusters with which the respective conversation-level topics are associated. In one example, the cluster size may be based on or indicative of the number of customer service conversations associated with the cluster (e.g., customer service conversations represented by conversational document representations included in the cluster). It will be appreciated that the quantitative ranking of the conversation-level topics in the set of conversation-level topics may be determined in other ways.

As illustrated in FIG. 3, following step 360, the method 300 proceeds to step 395 where the method 300 ends.

It will be appreciated that the method 300 may be expanded to include additional steps, or may be modified to replace steps with different steps, to combine steps, to omit steps, to perform steps in a different order, and so forth. For instance, in one example the processing system may repeat one or more steps of the method 300 (e.g., obtaining and processing additional customer service conversation records for purposes of determining a new quantitative ranking of conversation-level topics from additional customer service conversations between customers and customer service agents). Thus, it will be appreciated that these and other modifications are all contemplated within the scope of the present disclosure.

It will be appreciated that, although primarily described with respect to performing method 300 of FIG. 3 within a particular context (e.g., within the context of method 200 of FIG. 2 (e.g., where a quantitative ranking of conversation-level topics is determined and used as a basis for initiating one or more management actions)), in at least some examples the method 300 of FIG. 3 may be modified such that the quantitative ranking of conversation-level topics is not determined (e.g., step 360 of method 300 is not performed), such that the result of method 300 is identification of the set of conversation-level topics (e.g., the highly repetitive conversation-level topics, the most important conversation-level topics, and the like). It will be appreciated that the list of conversation-level topics may then be handled or used in various ways which may or may not include determination of quantitative rankings of conversation-level topics, initiating of management actions based on the conversation-level topics, and so forth. It will be appreciated that method 300 of FIG. 3 may be modified in various other ways (e.g., including additional steps, removing or modifying existing steps, and the like), used within various other contexts (e.g., to support various other methods, within various other environments, for various other purposes, and the like), and so forth.

Figure 4:
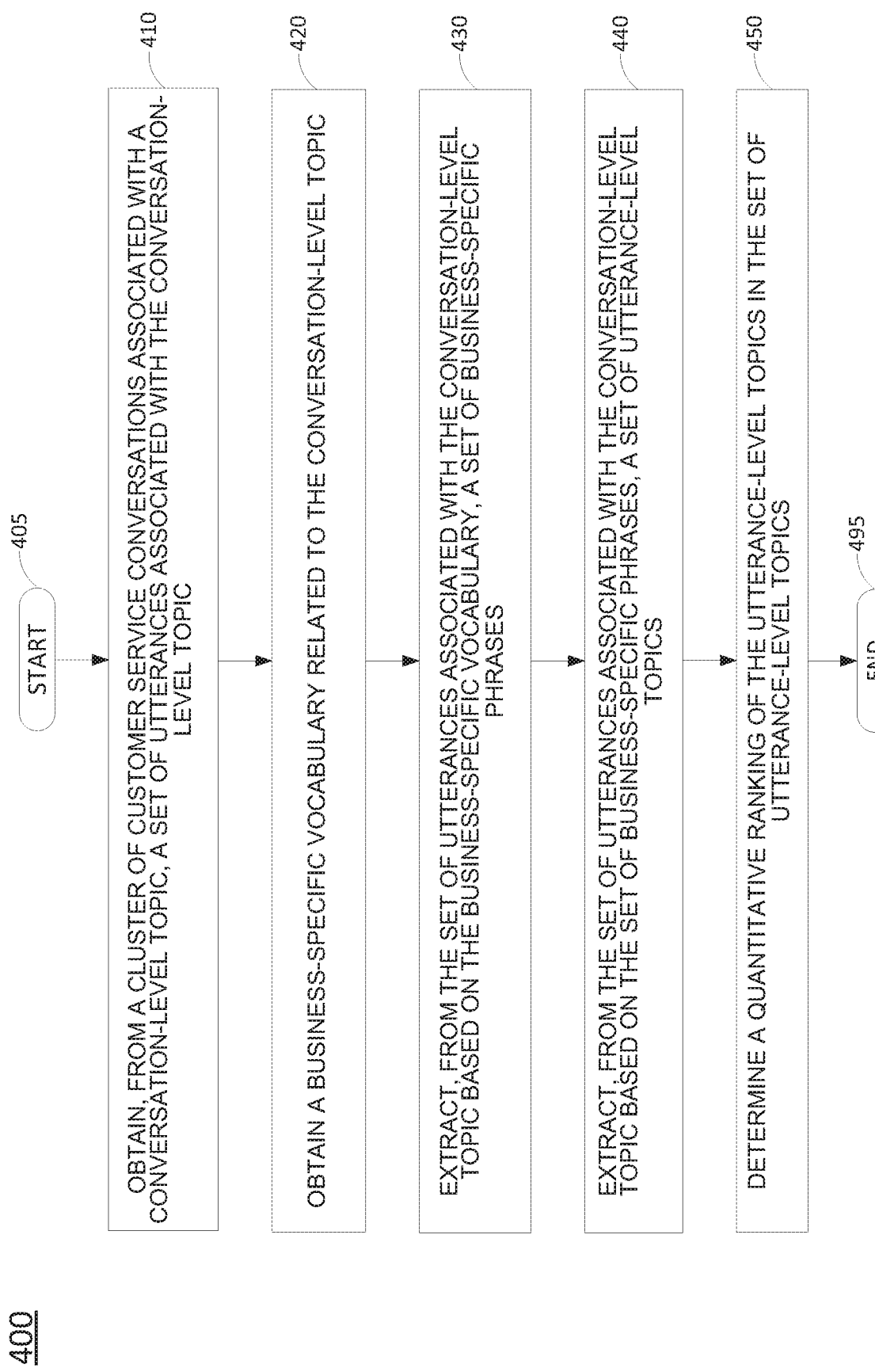
FIG. 4 illustrates a flowchart of an example method for determining a quantitative ranking of utterance-level topics from customer service conversations between customers and customer service agents.

FIG. 4 illustrates a flowchart of an example method for determining a quantitative ranking of utterance-level topics from conversations between customers and customer service agents. The method 400 may be configured to support utterance-level repetitive topic extraction and ranking. The method 400 may be configured to support fine-grained utterance-level repetitive topic extraction and ranking from a conversational cluster identified from a set of customer service conversation records (e.g., customer service conversation records associated with a conversation-level topic). In one example, the method 400 is performed by one or more components of the system 100 of FIG. 1 (e.g., customer service automation support system 135), one or more elements (e.g., a processor, or processors, performing operations stored in and loaded from a memory) of one or more components of the system 100 of FIG. 1, one or more components of the system 100 of FIG. 1 in conjunction with one or more other devices, and so forth. In one example, the steps, functions, and/or operations of method 400 may be performed by a computing system 600 as described in connection with FIG. 6. For instance, the computing system 600 may represent any one or more components of the system 100 of FIG. 1, or portion(s) thereof, which is/are configured to perform the steps, functions, and/or operations of the method 400. Similarly, in one example, the steps, functions, and/or operations of the method 400 may be performed by a processing system including one or more computing devices collectively configured to perform various steps, functions, and/or operations of the method 400 (e.g., multiple instances of the computing system 600 may collectively function as a processing system for performing various steps, functions, and/or operations of the method 400). It will be appreciated that the method 400 may be provided in various other ways.

As indicated above, method 400 of FIG. 4 may be performed as, or as part of, step 220 of FIG. 2. Accordingly, prior to execution of method 400, it is assumed that the processing system has obtained a set of customer service conversation records, for a set of customer service conversations between a set of customers and a set of customer service agents (e.g., as described with respect to step 210 of method 200 of FIG. 2 or in any other suitable manner), which may be processed for determining a quantitative ranking of utterance-level topics from a related set of customer service conversations between customers and customer service agents (e.g., from a cluster of customer service conversations which, as indicated above and discussed further below, may be determined during execution of method 300 of FIG. 3 or based on use of a portion of method 300 of FIG. 3). Accordingly, it will be appreciated that step 210 may be incorporated within method 400 of FIG. 4 and that one or more steps of method 300 may be incorporated within method 400 of FIG. 4, and, similarly, that various steps of method 400 of FIG. 4 may be included within method 300 of FIG. 3 and/or within method 200 of FIG. 2.

As illustrated in FIG. 4, the method 400 begins in step 405 and proceeds to step 410.

At step 410, the processing system may obtain, from a cluster of customer service conversations associated with a conversation-level topic, a set of utterances associated with the conversation-level topic. The conversation-level topic may be a conversation-level topic in common for the cluster of customer service conversations. The conversation-level topic may be a primary conversation-level topic for the cluster of customer service conversations. In one example, the set of utterances may be obtained by selecting one of the clusters generated based on execution of method 300 of FIG. 3. In one example, the set of utterances may be obtained based on execution of a portion of the steps of method 300 of FIG. 3 (e.g., steps 310-340) to obtain a cluster of customer service conversations associated with the conversation-level topic and, thus, to obtain the utterances from the cluster of customer service conversations associated with the conversation-level topic.

At step 420, the processing system may obtain a business-specific vocabulary related to the conversation-level topic. The business-specific vocabulary may include words and phrases that are or may be relevant under various scenarios, such as for specific types of entities, specific types of products or services for which customer service is provided, specific types of customer service, specific conversation-level topics, and so forth. For example, for a call center for technical support for a telecommunications company, the business-specific vocabulary may include words such as "router," "gateway," and so forth. For example, for a service center for ordering support for an e-commerce company, the business-specific vocabulary may include words such as "account," "shopping cart," "credit card," and so forth. The business-specific vocabulary may be predefined by experts, defined over time based on analysis of customer service conversation records, and so forth.

At step 430, the processing system may extract, from the set of utterances associated with the conversation-level topic based on the business-specific vocabulary, a set of business-specific phrases. In one example, the extraction of the set business-specific phrases may include extracting phrases with n words that include at least one word from the business-specific vocabulary. In one example, n may be a tunable parameter.

At step 440, the processing system may extract, from the set of utterances associated with the conversation-level topic based on the set of business-specific phrases, a set of utterance-level topics. In one example, the processing system may extract the set of utterance-level topics from the set of utterances associated with the conversation-level topic based on a topic extraction algorithm. In one example, the processing system may extract the set of utterance-level topics from the set of utterances associated with the conversation-level topic based on a generative statistical model. In one example, the generative statistical model includes an LDA model. It is noted that use of the business-specific phrases restricts the generative statistical model (e.g., the LDA model) in a manner that supports filtering of irrelevant terms and identification of instructive topics. In one example, the processing system may extract the set of utterance-level topics from the set of utterances associated with the conversation-level topic by, for each utterance in the set of utterances associated with the conversation-level topic, determining a probability distribution of topics of the respective utterance (e.g., for topics which are composed of business-specific phrases from the set of business-specific phrases) and assigning the topic with the largest probability to the respective utterance as the respective utterance-level topic for the respective utterance. It will be appreciated that the set of utterance-level topics for the respective utterances may represent the most repetitive utterance-level topics from the conversation-level topic (and, thus, from the set of customer service conversation records associated with the conversation-level topic).

At step 450, the processing system may determine a quantitative ranking of the utterance-level topics in the set of utterance-level topics. In one example, the quantitative ranking of the utterance-level topics in the set of utterance-level topics may be based on the respective probabilities of the respective utterance-level topics in the set of utterance-level topics (e.g., based on the determination of the probabilities of the topics in determining the probability distributions of topics of the respective utterances as described with respect to step 440). It will be appreciated that the quantitative ranking of the utterance-level topics in the set of utterance-level topics may be determined in other ways.

As illustrated in FIG. 4, following step 450, the method 400 proceeds to step 495 where the method 400 ends.

It will be appreciated that the method 400 may be expanded to include additional steps, or may be modified to replace steps with different steps, to combine steps, to omit steps, to perform steps in a different order, and so forth. For instance, in one example the processing system may repeat one or more steps of the method 400 (e.g., repeating method 400 for one or more other sets of utterances associated with one or more other conversation-level topics (e.g., for one or more other clusters identified during execution of method 300 of FIG. 3)). Thus, it will be appreciated that these and other modifications are all contemplated within the scope of the present disclosure.

It will be appreciated that, although primarily described with respect to performing method 400 of FIG. 4 within a particular context (e.g., within the context of method 200 of FIG. 2 (e.g., where a quantitative ranking of utterance-level topics is determined and used as a basis for initiating one or more management actions)), in at least some examples method 400 of FIG. 4 may be modified such that the quantitative ranking of utterance-level topics is not determined (e.g., step 450 of method 400 is not performed), such that the result of method 400 is identification of the set of utterance-level topics (e.g., the highly repetitive utterance-level topics, the most important utterance-level topics, and the like). It will be appreciated that the list of utterance-level topics may then be handled or used in various ways which may or may not include determination of quantitative rankings of the utterance-level topics, initiating of management actions based on the utterance-level topics, and so forth. It will be appreciated that method 400 of FIG. 4 may be modified in various other ways (e.g., including additional steps, removing or modifying existing steps, and the like), used within various other contexts (e.g., to support various other methods, within various other environments, for various other purposes, and the like), and so forth.

Figure 5:
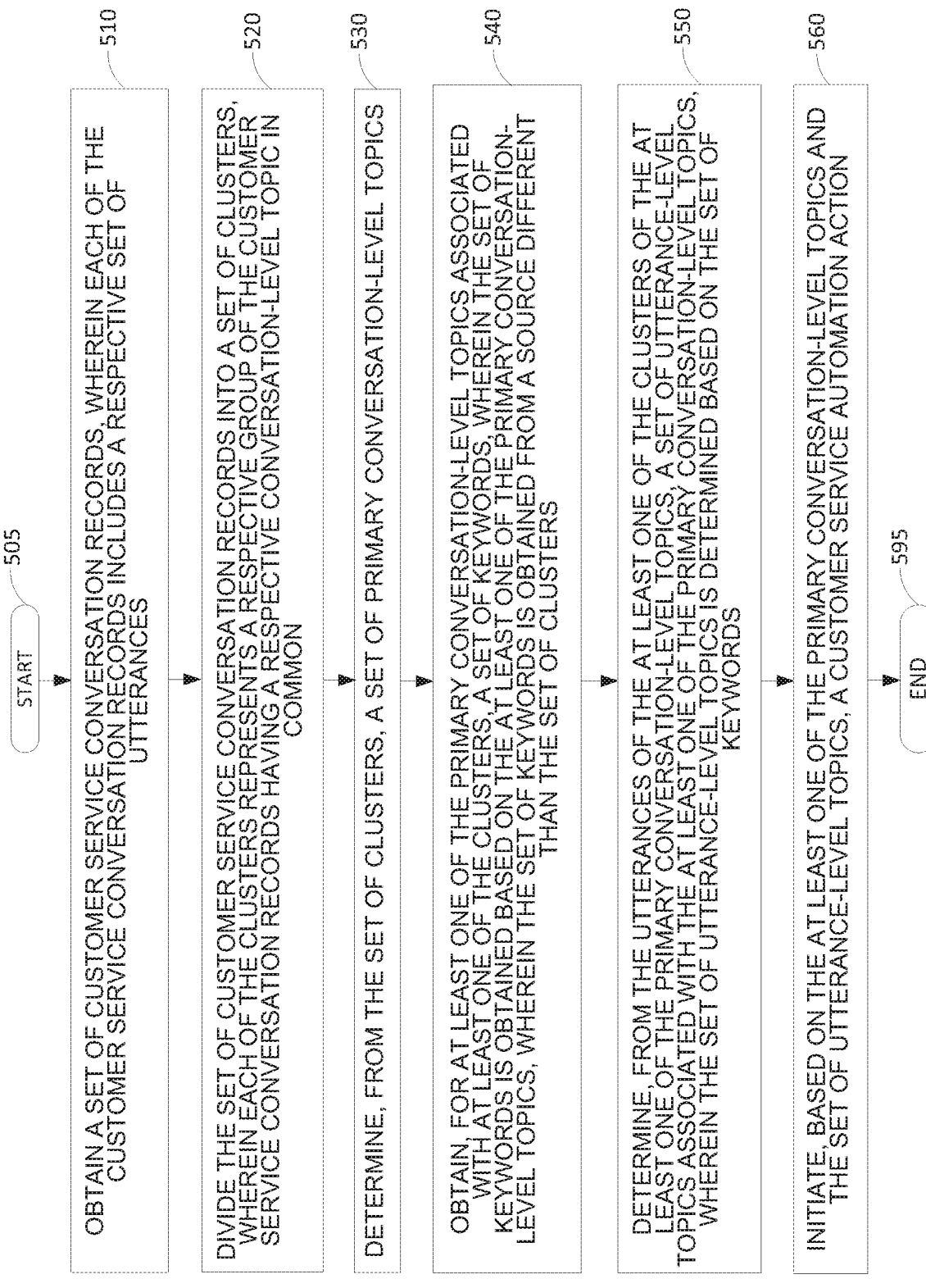
FIG. 5 illustrates a flowchart of an example method for initiating a customer service automation action based on analysis of a set of customer service conversation records.

FIG. 5 illustrates a flowchart of an example method for initiating a customer service automation action based on analysis of a set of customer service conversation records. In one example, the method 500 is performed by one or more components of the system 100 of FIG. 1 (e.g., customer service automation support system 135), one or more elements (e.g., a processor, or processors, performing operations stored in and loaded from a memory) of one or more components of the system 100 of FIG. 1, one or more components of the system 100 of FIG. 1 in conjunction with one or more other devices, and so forth. In one example, the steps, functions, and/or operations of method 500 may be performed by a computing system 600 as described in connection with FIG. 6. For instance, the computing system 600 may represent any one or more components of the system 100 of FIG. 1, or portion(s) thereof, which is/are configured to perform the steps, functions, and/or operations of the method 500. Similarly, in one example, the steps, functions, and/or operations of the method 500 may be performed by a processing system including one or more computing devices collectively configured to perform various steps, functions, and/or operations of the method 500 (e.g., multiple instances of the computing system 600 may collectively function as a processing system for performing various steps, functions, and/or operations of the method 500). As indicated above, method 500 of FIG. 5 may be performed as, or as part of, method 200 of FIG. 2. It will be appreciated that the method 500 may be provided in various other ways.

As illustrated in FIG. 5, the method 500 begins in step 505 and proceeds to step 510.

At step 510, the processing system obtain a set of customer service conversation records, wherein each of the customer service conversation records includes a respective set of utterances. The customer service conversation records may be related to customer service provided to the customers by the customer service agents. The customer service conversation records may include audio records of voice conversations, text records of text-based conversations, and so forth. The customer service conversation records may include various utterances related to various conversation-level topics, various utterance-level topics, and so forth.

At step 520, the processing system may divide the set of customer service conversation records into a set of clusters, wherein each of the clusters represents a respective group of the customer service conversation records having a respective conversation-level topic in common. In one example, dividing the set of customer service conversation records into the set of clusters may include generating a set of conversational documents including, for each customer service conversation record in the set of customer service conversation records, a respective conversational document, generating a set of conversational document representations including, for each conversational document in the set of conversational documents, a respective conversational document representation of the respective conversational document, and dividing, based on a clustering algorithm, the set of conversational document representations into the set of clusters. In one example, the set of conversational document representations includes a respective set of neural representations of the respective conversational documents. In one example, the neural representations of the respective conversational documents are generated based on at least one of a training of a deep neural network and a conversation-level neural feature extractor. In one example, for at least one of the customer service conversation records, the respective set of utterances includes a respective set of topic-related utterances and a respective set of non-topic-related utterances, and generating the respective conversational document includes performing, for the respective customer service conversation record, an utterance pre-cleaning operation for removing the respective set of non-topic-related utterances from the respective customer service conversation record and maintaining the respective set of topic-related utterances within the respective customer service conversation record and concatenating, for the respective customer service conversation records, the respective topic-related utterances in the set of topic-related utterances to form the respective conversational document.

At step 530, the processing system may determine, from the set of clusters, a set of primary conversation-level topics. In one example, the set of primary conversation-level topics may include one primary conversation-level topic from each of the clusters, may include primary conversation-level topics from only a subset of the clusters, may include multiple primary conversation-level topics from one or more of the clusters, and so forth. In one example, determining the set of primary conversation-level topics includes determining, from at least one of the clusters based application of a topic extraction algorithm to the utterances of the at least one of the clusters, a respective primary conversation-level topic for the at least one of the clusters. In one example, the topic extraction algorithm is based on an LDA model. In one example, for at least one of the clusters in the set of clusters, a respective primary conversation-level topic determined for the at least one of the clusters may be different than the respective conversation-level topic in common for the at least one of the clusters (i.e., the topic which causes the customer service conversation records may not necessarily be the conversation-level topic that is extracted from the customer service conversation records as the primary conversation-level topic for the respective cluster). In one example, the at least one of the primary conversation-level topics is selected based on a quantitative ranking of the primary conversation-level topics in the set of primary conversation-level topics.

At step 540, the processing system may obtain, for at least one of the primary conversation-level topics associated with at least one of the clusters, a set of keywords. The set of keywords may be obtained based on the at least one of the primary conversation-level topics. The set of keywords may be obtained based on the at least one of the primary conversation-level topics since the set of keywords that is used to extract utterance-level topics may vary across different primary conversation-level topics. The set of keywords may be obtained from a source different than the utterances of the at least one of the clusters of the at least one of the primary conversation-level topics. The set of keywords may be obtained from a source different than the set of clusters (e.g., independent of the various utterances of the customer service conversation records grouped into the clusters). The source may be any suitable source of such information (e.g., a file that is independent of the customer service conversation records or utterances from the customer service conversation records, a memory, a system, and so forth). The set of keywords may be based on and/or include a business-specific vocabulary related to the primary conversation-level topic (e.g., words and/or phrases that are or may be relevant under various scenarios, such as for specific types of entities, specific types of products or services for which customer service is provided, specific types of customer service, specific conversation-level topics, and so forth), which may be predefined by experts, defined over time based on analysis of customer service conversation records, and so forth.

At step 550, the processing system may determine, from the utterances of the at least one of the clusters of the at least one of the primary conversation-level topics, a set of utterance-level topics associated with the at least one of the primary conversation-level topics. The set of utterance-level topics may be determined based on the set of keywords. In one example, determining the set of utterance-level topics associated with the at least one of the primary conversation-level topics includes extracting, from the utterances of the at least one of the clusters of the at least one of the primary conversation-level topics, a set of phrases, wherein the set of phrases is extracted based on the set of keywords, and extracting, from the utterances of the at least one of the clusters of the at least one of the primary conversation-level topics, the set of utterance-level topics, wherein the set of utterance-level topics is extracted based on the set of phrases and using a topic extraction algorithm. In one example, the set of keywords includes a business-specific vocabulary and the set of phrases includes a set of business-specific phrases. In one example, the topic extraction algorithm is based on an LDA model.

At step 560, the processing system may initiate, based on the at least one of the primary conversation-level topics and the set of utterance-level topics, a customer service automation action. In one example, the customer service automation action includes one or more of providing a notification, providing a recommendation, generating software, and so forth. In one example, the customer service automation action includes providing a recommendation for a creation of a chatbot that is based on the at least one of the primary conversation-level topics and a recommendation for a design of the chatbot that is based on the set of utterance-level topics associated with the at least one of the primary conversation-level topics.

As illustrated in FIG. 5, following step 560, the method 500 proceeds to step 595 where the method 500 ends.

It will be appreciated that the method 500 may be expanded to include additional steps, or may be modified to replace steps with different steps, to combine steps, to omit steps, to perform steps in a different order, and so forth. For instance, in one example the processing system may repeat one or more steps of the method 500 (e.g., repeating all or part of method 500 for one or more other primary conversation-level topics). Thus, it will be appreciated that these and other modifications are all contemplated within the scope of the present disclosure.

It will be appreciated that, although not expressly specified above, one or more steps of one or more of the method 200, the method 300, the method 400, and/or the method 500 may include a storing, displaying, and/or outputting step as required for a particular application. In other words, any data, records, fields, and/or intermediate results discussed in the method(s) can be stored, displayed, and/or outputted to another device as required for a particular application. Furthermore, operations, steps, or blocks in one or more of the method 200, the method 300, the method 400, and/or the method 500 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative example and is not intended to indicate that steps not labelled as optional steps to be deemed to be essential steps. Furthermore, operations, steps, or blocks in one or more of the method 200, the method 300, the method 400, and/or the method 500 can be combined, separated, and/or performed in a different order from that described above, without departing from the examples of the present disclosure.

It will be appreciated that various examples for supporting automation of customer service as presented herein may provide various advantages or potential advantages. For example, various examples for supporting automation of customer service may support an advanced data-driven approach for customer service center automation strategic planning and design. For example, various examples for supporting automation of customer service may extract repetitive conversational topics and/or utterance-level topics from customer service conversation records and use the extracted topics to support customer service center automation. For example, various examples for supporting automation of customer service may provide improved automation of customer service based on use of topic modeling and neural features. For example, various examples for supporting automation of customer service may provide a more efficient and scalable data-driven approach for identifying and prioritizing automation options for customer service center automation without having to rely on experts familiar with business and operational aspects of the entities for which customer service is being provided. For example, various examples for supporting automation of customer service may enable mining of customer service data, such as customer phone call records and online chat records, for various purposes (e.g., monitoring product/service quality, problem/issue tracking, and so forth). For example, various examples for supporting automation of customer service may obviate the need for use of generic chatbots for handling multiple tasks by using analysis of customer service conversation records to identify specific topics for which more specific and intelligent chatbots (e.g., more accurate and reliable) may be designed (e.g., for handling specialized tasks such as cancelling customer orders, responding to requests for auto-insurance quotes, and the like). For example, various examples for supporting automation of customer service may provide an automatic repetitive topic extraction system to support automation of specific customer service situations and functions (e.g., determining which types of customer service requests should have the highest automation priority, determining the design of the conversational dialog of a chatbot(s) to solve specific customer service requirements, and so forth). For example, various examples for supporting automation of customer service may use advanced natural language processing and machine learning techniques to quantitatively rank the importance of conversation topics of customer service interactions and to prioritize customer service center automation tasks, thereby enabling data-driven automation decisions and significantly reducing the cost of human labor wasted in repetitive customer service work by supporting automation of various customer service center tasks related to greater numbers of customer service agent interactions (e.g., if some call center agents take care of phone calls about order status tracking while other call center agents handle phone calls about troubleshooting malfunctioning devices, and the former task incurs a higher number of phone calls than the latter task, then it may be more beneficial (e.g., from a business cost reduction perspective), to automate the former task before automating the latter task). For example, various examples for supporting automation of customer service may support quantitative ranking of automation priority without human assistance to inspect the audio records of phone calls, may support quantitative ranking of automation priority within the context of customer service involving a large number of distinctive tasks, and so forth. It will be appreciated that various examples for supporting automation of customer service as presented herein may provide various other advantages or potential advantages.

It will be appreciated that, as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures and the like which may cause a processing system executing computer-readable instructions, code, and/or programs to function differently depending upon the values of the variables or other data structures that are provided. As referred to herein a "processing system" may include a computing device, or computing system, including one or more processors, or cores (e.g., as illustrated in FIG. 6 and discussed below) or multiple computing devices collectively configured to perform various steps, functions, and/or operations in accordance with the present disclosure.

Figure 6:
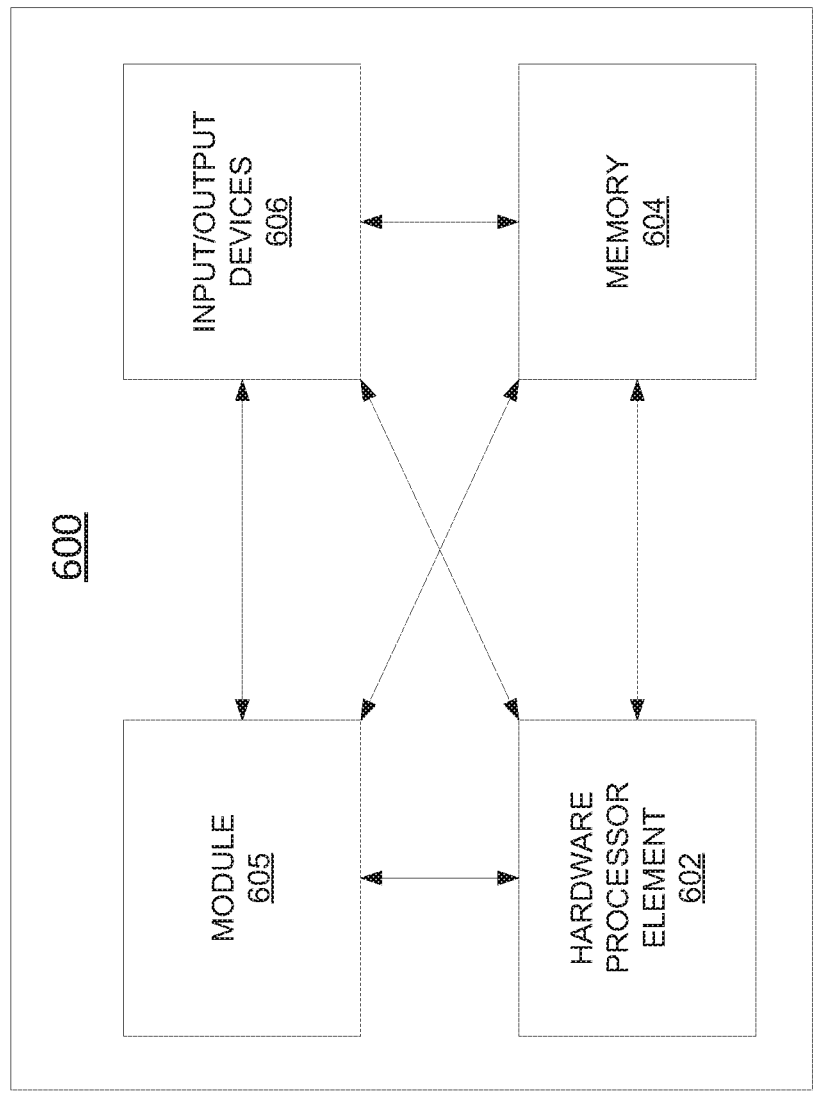
FIG. 6 illustrates a high level block diagram of a computing system specifically programmed to perform the steps, functions, blocks and/or operations described herein.

FIG. 6 depicts a high-level block diagram of a computing system 600 (e.g., a computing device or a processing system) specifically programmed to perform functions described herein. For example, any one or more components or devices illustrated in FIG. 1 or described in connection with method 200 of FIG. 2, method 300 of FIG. 3, method 400 of FIG. 4, or method 500 of FIG. 5 may be implemented as the computing system 600. As depicted in FIG. 6, the computing system 600 includes a hardware processor element 602 (e.g., including one or more hardware processors, which may include one or more microprocessor(s), one or more central processing units (CPUs), and/or the like, where the hardware processor element 602 also may represent one example of a "processing system" as referred to herein), a memory 604 (e.g., random access memory (RAM), read only memory (ROM), a disk drive, an optical drive, a magnetic drive, and/or a Universal Serial Bus (USB) drive), a module 605 for supporting automation of customer service and/or any other function or combination of functions presented herein, and one or more input/output devices 606 (e.g., a camera, a video camera, storage devices, including but not limited to, a tape drive, a floppy drive, a hard disk drive, or a compact disk drive, a receiver, a transmitter, a speaker, a display, a speech synthesizer, an output port, and a user input device (such as a keyboard, a keypad, a mouse, and the like)).

It will be appreciated that, although only one hardware processor element 602 is shown, the computing system 600 may employ a plurality of hardware processor elements. Furthermore, although only one computing device is shown in FIG. 6, if the method(s) as discussed above is implemented in a distributed or parallel manner for a particular illustrative example, e.g., the steps of the above method(s) or the entire method(s) are implemented across multiple or parallel computing devices, then the computing system 600 of FIG. 6 may represent each of those multiple or parallel computing devices. Furthermore, one or more hardware processor elements (e.g., hardware processor element 602) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 602 also may be configured or programmed to cause other devices to perform one or more operations as discussed above. In other words, the hardware processor element 602 may serve the function of a central controller directing other devices to perform the one or more operations as discussed above.

It will be appreciated that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the module 605 for supporting automation of customer service and/or any other function or combination of functions presented herein (e.g., a software program include computer-executable instructions) can be loaded into memory 604 and executed by hardware processor element 602 to implement the steps, functions and/or operations as discussed above in connection with example method 200 of FIG. 2, example method 300 of FIG. 3, example method 400 of FIG. 4, or example method 500 of FIG. 5. Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 602) executing the computer-readable instructions relating to the above described method(s) can be perceived as a programmed processor or a specialized processor. As such, the module 605 for supporting automation of customer service and/or any other function or combination of functions presented herein (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
    obtaining, by a processing system including at least one processor, a set of customer service conversation records, wherein each of the customer service conversation records includes a respective set of utterances;
    dividing, by the processing system, the set of customer service conversation records into a set of clusters, wherein each of the clusters represents a respective group of the customer service conversation records having a respective conversation-level topic in common, wherein the dividing the set of customer service conversation records into the set of clusters comprises generating a set of conversational documents including, for each customer service conversation record in the set of customer service conversation records, a respective conversational document, wherein, for at least one of the customer service conversation records, the respective set of utterances comprises a respective set of topic-related utterances and a respective set of non-topic-related utterances, and wherein the generating of the respective conversational document comprises:
        performing, for the at least one of the customer service conversation records, an utterance pre-cleaning operation for removing the respective set of non-topic-related utterances from the at least one of the customer service conversation records and maintaining the respective set of topic-related utterances within the at least one of the customer service conversation records; and
        concatenating, for the at least one of the customer service conversation records, the respective topic-related utterances in the set of topic-related utterances to form the respective conversational document;
    determining, by the processing system from the set of clusters, a set of primary conversation-level topics;
    obtaining, by the processing system for at least one of the primary conversation-level topics associated with at least one of the clusters, a set of keywords, wherein the set of keywords is obtained based on the at least one of the primary conversation-level topics, wherein the set of keywords is obtained from a source different than the set of clusters;
    determining, by the processing system from the utterances of the at least one of the clusters of the at least one of the primary conversation-level topics, a set of utterance-level topics associated with the at least one of the primary conversation-level topics, wherein the set of utterance-level topics is determined based on the set of keywords; and
    initiating, by the processing system based on the at least one of the primary conversation-level topics and the set of utterance-level topics, a customer service automation action.

2. The method of claim 1, wherein dividing the set of customer service conversation records into the set of clusters further comprises:
    generating, by the processing system, a set of conversational document representations including, for each conversational document in the set of conversational documents, a respective conversational document representation of the respective conversational document; and
    dividing, by the processing system based on a clustering algorithm, the set of conversational document representations into the set of clusters.

3. The method of claim 2, wherein the set of conversational document representations comprises a respective set of neural representations of the respective conversational documents.

4. The method of claim 3, wherein the neural representations of the respective conversational documents are generated based on at least one of: a training of a deep neural network or a conversation-level neural feature extractor.

5. The method of claim 1, wherein the determining the set of primary conversation-level topics comprises:
determining, from at least one of the clusters based on an application of a topic extraction algorithm to the utterances of the at least one of the clusters, a respective primary conversation-level topic for the at least one of the clusters.

6. The method of claim 5, wherein the topic extraction algorithm is based on a Latent Dirichlet Allocation (LDA) model.

7. The method of claim 1, wherein, for at least one of the clusters in the set of clusters, a respective primary conversation-level topic determined for the at least one of the clusters is different than the respective conversation-level topic in common for the at least one of the clusters.

8. The method of claim 1, wherein the at least one of the primary conversation-level topics is selected based on a quantitative ranking of the primary conversation-level topics in the set of primary conversation-level topics.

9. The method of claim 1, wherein the determining the set of utterance-level topics associated with the at least one of the primary conversation-level topics comprises:
extracting, by the processing system from the utterances of the at least one of the clusters of the at least one of the primary conversation-level topics, a set of phrases, wherein the set of phrases is extracted based on the set of keywords; and
extracting, by the processing system from the utterances of the at least one of the clusters of the at least one of the primary conversation-level topics, the set of utterance-level topics, wherein the set of utterance-level topics is extracted based on the set of phrases and using a topic extraction algorithm.

10. The method of claim 9, wherein the set of keywords comprises a business-specific vocabulary and the set of phrases comprises a set of business-specific phrases.

11. The method of claim 9, wherein the topic extraction algorithm is based on a Latent Dirichlet Allocation (LDA) model.

12. The method of claim 1, further comprising:
determining, by the processing system, a quantitative ranking of the primary conversation-level topics in the set of primary conversation-level topics.

13. The method of claim 12, further comprising:
obtaining, by the processing system, a second set of customer service conversation records;
determining, by the processing system based on the second set of customer service conversation records, a second quantitative ranking of a second set of primary conversation-level topics extracted from the second set of customer service conversation records; and
evaluating, by the processing system based on the quantitative ranking and the second quantitative ranking, the at least one of the primary conversation-level topics.

14. The method of claim 12, further comprising:
generating, by the processing system based on the quantitative ranking, an indication of a potential problem to be addressed.

15. The method of claim 1, further comprising:
determining, by the processing system, a quantitative ranking of the utterance-level topics in the set of utterance-level topics.

16. The method of claim 15, wherein the customer service automation action is selected based on the quantitative ranking of the utterance-level topics in the set of utterance-level topics.

17. The method of claim 1, wherein the customer service automation action comprises providing a recommendation for a creation of a chatbot that is based on the at least one of the primary conversation-level topics and a recommendation for a design of the chatbot that is based on the set of utterance-level topics associated with the at least one of the primary conversation-level topics.

18. A non-transitory computer-readable storage medium storing instructions which, when executed by a processing system, cause the processing system to perform operations, the operations comprising:
obtaining a set of customer service conversation records, wherein each of the customer service conversation records includes a respective set of utterances;
dividing the set of customer service conversation records into a set of clusters, wherein each of the clusters represents a respective group of the customer service conversation records having a respective conversation-level topic in common, wherein dividing the set of customer service conversation records into the set of clusters comprises generating a set of conversational documents including, for each customer service conversation record in the set of customer service conversation records, a respective conversational document, wherein, for at least one of the customer service conversation records, the respective set of utterances comprises a respective set of topic-related utterances and a respective set of non-topic-related utterances, and wherein the generating of the respective conversational document comprises:
performing, for the at least one of the customer service conversation records, an utterance pre-cleaning operation for removing the respective set of non-topic-related utterances from the at least one of the customer service conversation records and maintaining the respective set of topic-related utterances within the at least one of the customer service conversation records; and
concatenating, for the at least one of the customer service conversation records, the respective topic-related utterances in the set of topic-related utterances to form the respective conversational document;
determining, from the set of clusters, a set of primary conversation-level topics;
obtaining, for at least one of the primary conversation-level topics associated with at least one of the clusters, a set of keywords, wherein the set of keywords is obtained based on the at least one of the primary conversation-level topics, wherein the set of keywords is obtained from a source different than the set of clusters;
determining, from the utterances of the at least one of the clusters of the at least one of the primary conversation-level topics, a set of utterance-level topics associated with the at least one of the primary conversation-level topics, wherein the set of utterance-level topics is determined based on the set of keywords; and initiating, based on the at least one of the primary conversation-level topics and the set of utterance-level topics, a customer service automation action.

19. An apparatus comprising:

a processing system including at least one processor; and a computer-readable medium storing instructions which, when executed by the processing system, cause the processing system to perform operations, the operations comprising:

obtaining a set of customer service conversation records, wherein each of the customer service conversation records includes a respective set of utterances;

dividing the set of customer service conversation records into a set of clusters, wherein each of the clusters represents a respective group of the customer service conversation records having a respective conversation-level topic in common, wherein dividing the set of customer service conversation records into the set of clusters comprises generating a set of conversational documents including, for each customer service conversation record in the set of customer service conversation records, a respective conversational document, wherein, for at least one of the customer service conversation records, the respective set of utterances comprises a respective set of topic-related utterances and a respective set of non-topic-related utterances, and wherein the generating of the respective conversational document comprises:

performing, for the at least one of the customer service conversation records, an utterance pre-cleaning operation for removing the respective set of non-topic-related utterances from the at least one of the customer service conversation records and maintaining the respective set of topic-related utterances within the at least one of the customer service conversation records; and concatenating, for the at least one of the customer service conversation records, the respective topic-related utterances in the set of topic-related utterances to form the respective conversational document;

determining, from the set of clusters, a set of primary conversation-level topics;

obtaining, for at least one of the primary conversation-level topics associated with at least one of the clusters, a set of keywords, wherein the set of keywords is obtained based on the at least one of the primary conversation-level topics, wherein the set of keywords is obtained from a source different than the set of clusters;

determining, from the utterances of the at least one of the clusters of the at least one of the primary conversation-level topics, a set of utterance-level topics associated with the at least one of the primary conversation-level topics, wherein the set of utterance-level topics is determined based on the set of keywords; and initiating, based on the at least one of the primary conversation-level topics and the set of utterance-level topics, a customer service automation action.

20. The apparatus of claim 19, wherein the dividing the set of customer service conversation records into the set of clusters further comprises:

generating a set of conversational document representations including, for each conversational document in the set of conversational documents, a respective conversational document representation of the respective conversational document; and dividing, based on a clustering algorithm, the set of conversational document representations into the set of clusters.

* * * * *